March 14, 1933.  J. G. DUNKER  1,901,153
BOOKKEEPING MACHINE
Filed Sept. 8, 1924   17 Sheets-Sheet 5
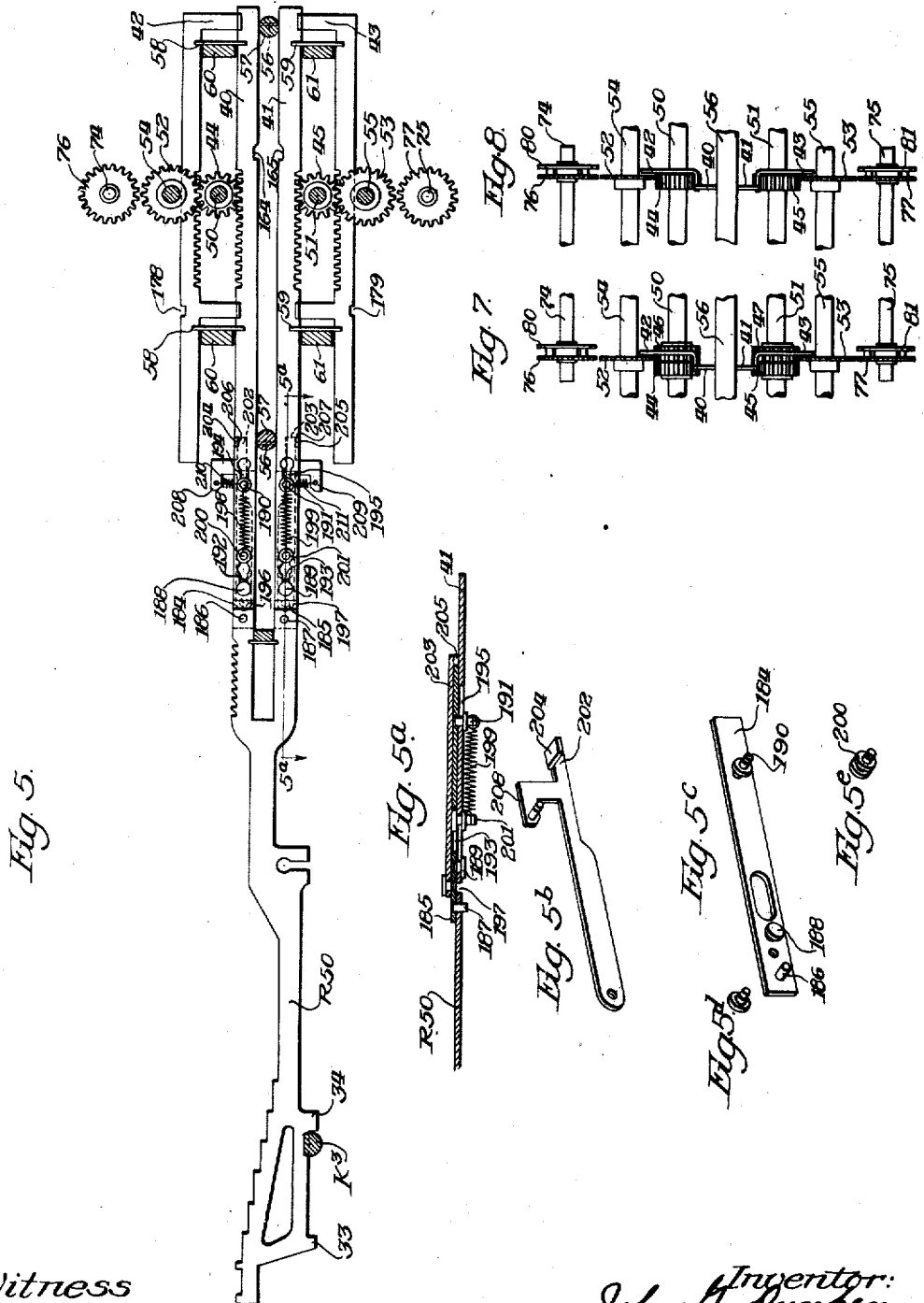

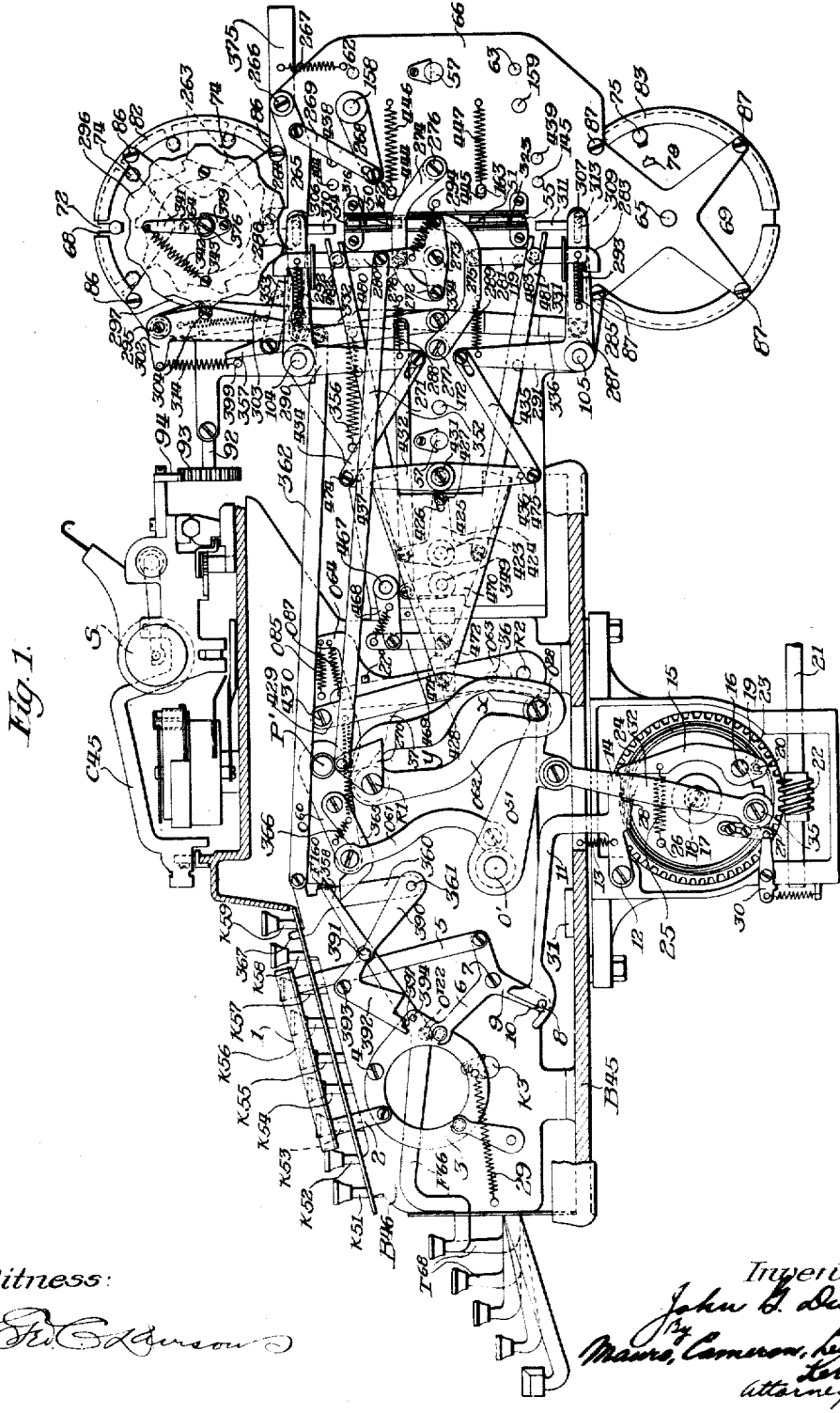

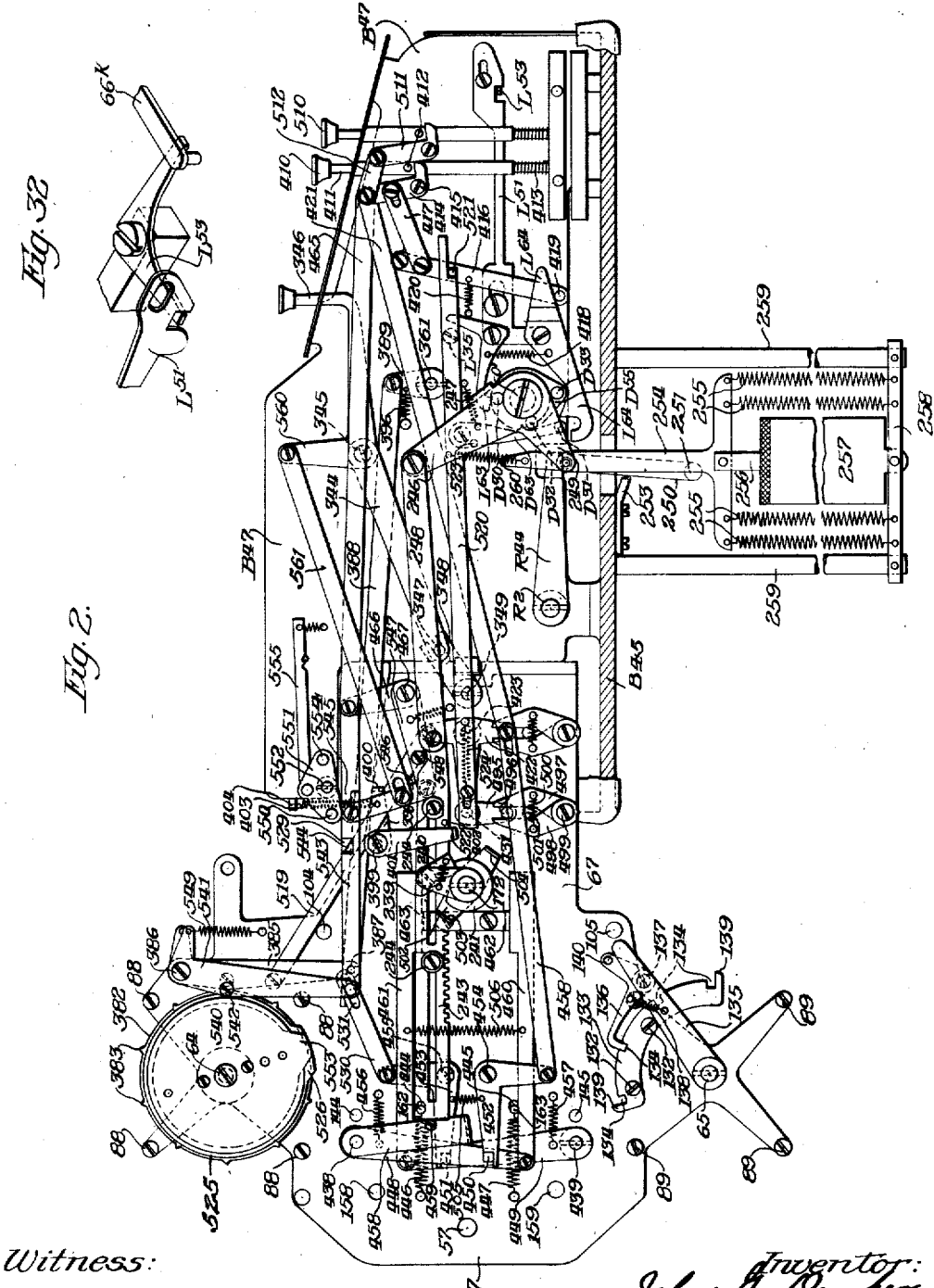

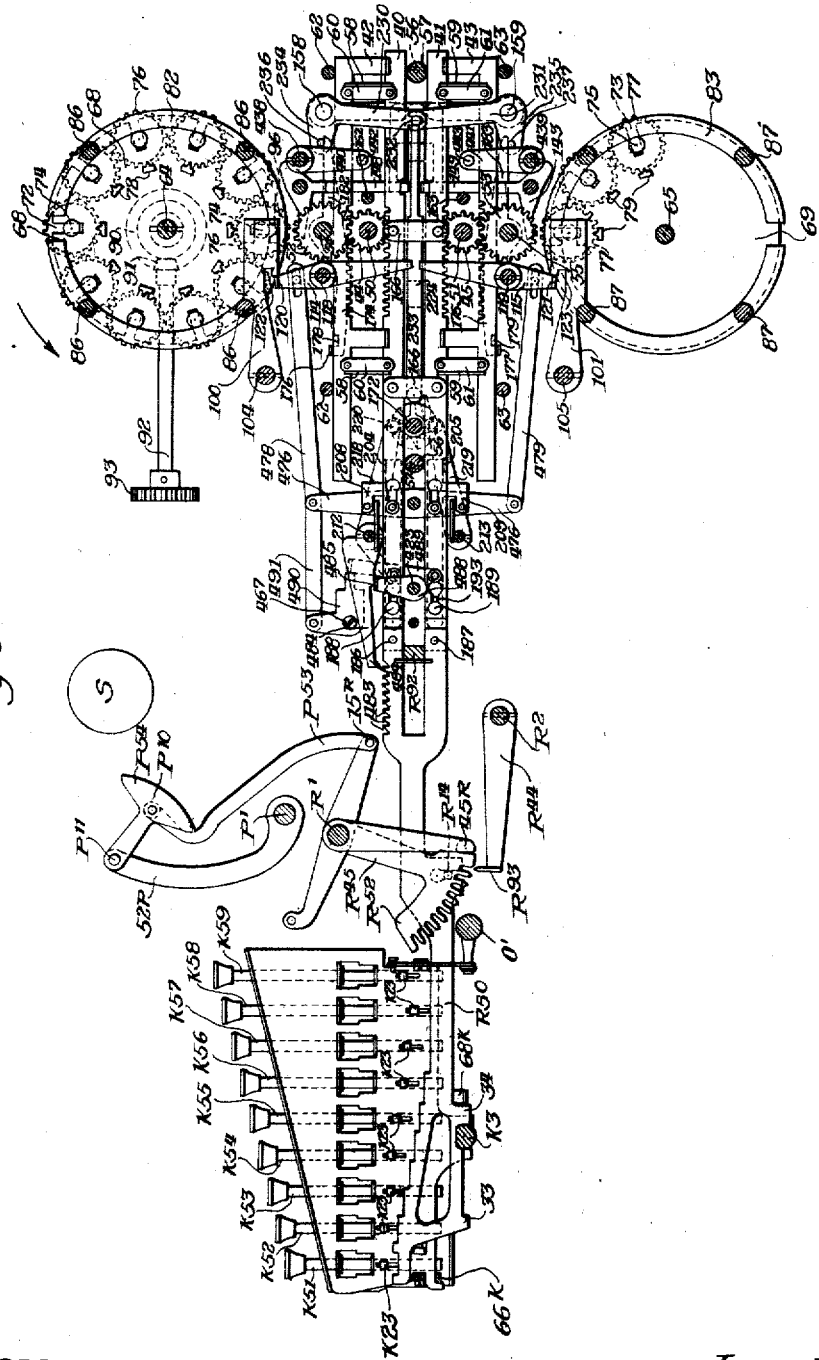

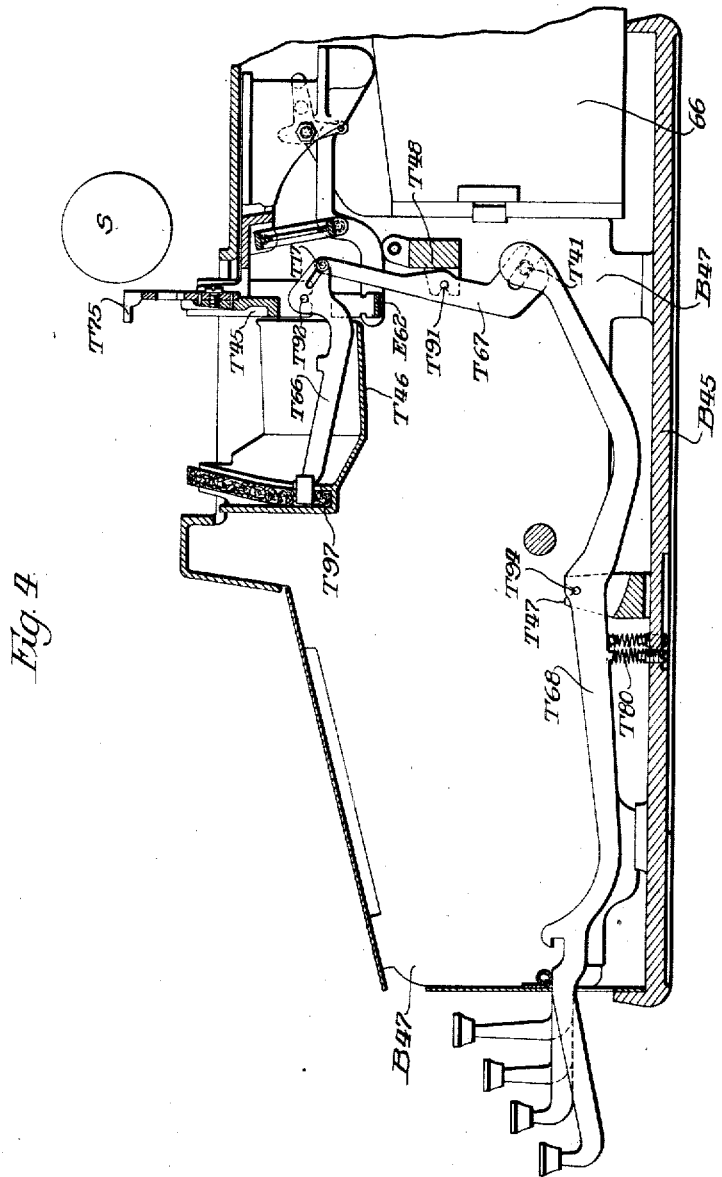

March 14, 1933.  J. G. DUNKER  1,901,153
BOOKKEEPING MACHINE
Filed Sept. 8, 1924   17 Sheets-Sheet 6
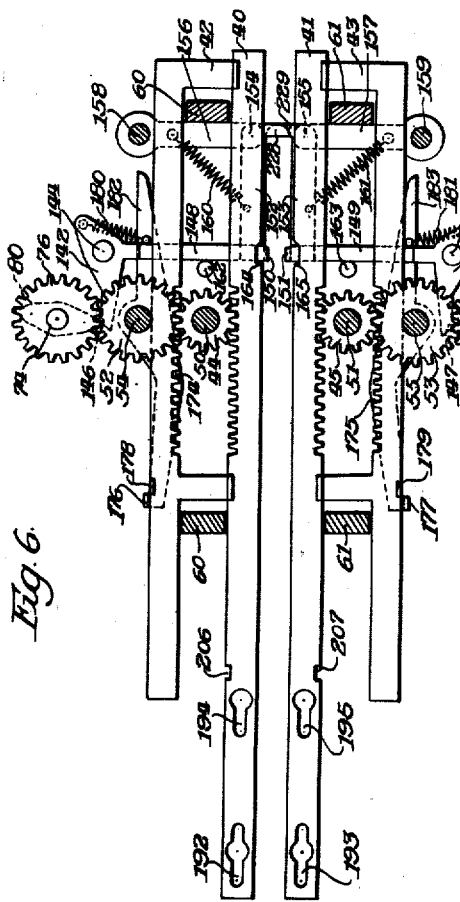
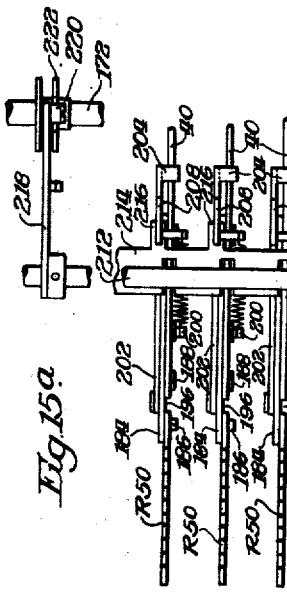
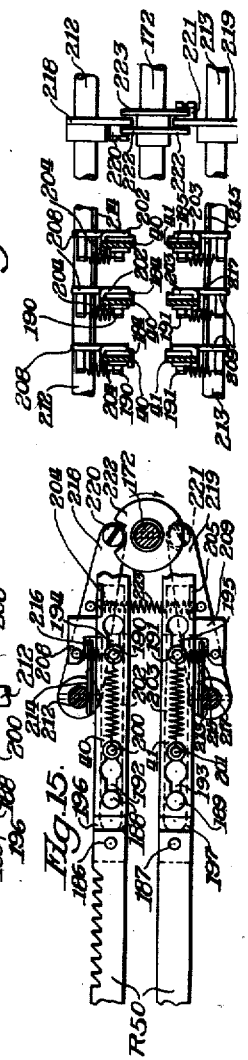

March 14, 1933.  J. G. DUNKER  1,901,153
BOOKKEEPING MACHINE
Filed Sept. 8, 1924   17 Sheets-Sheet 7
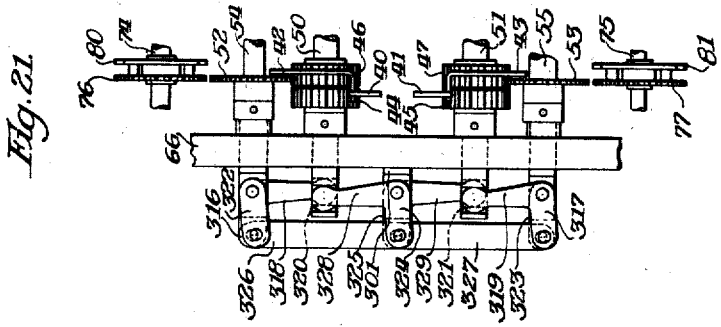
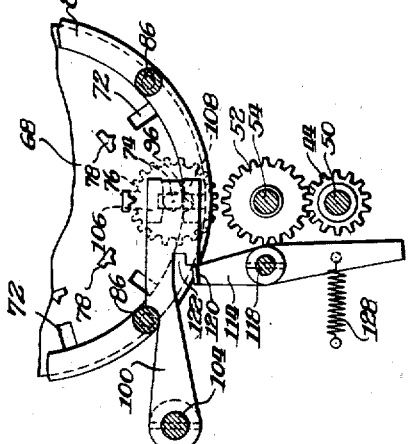

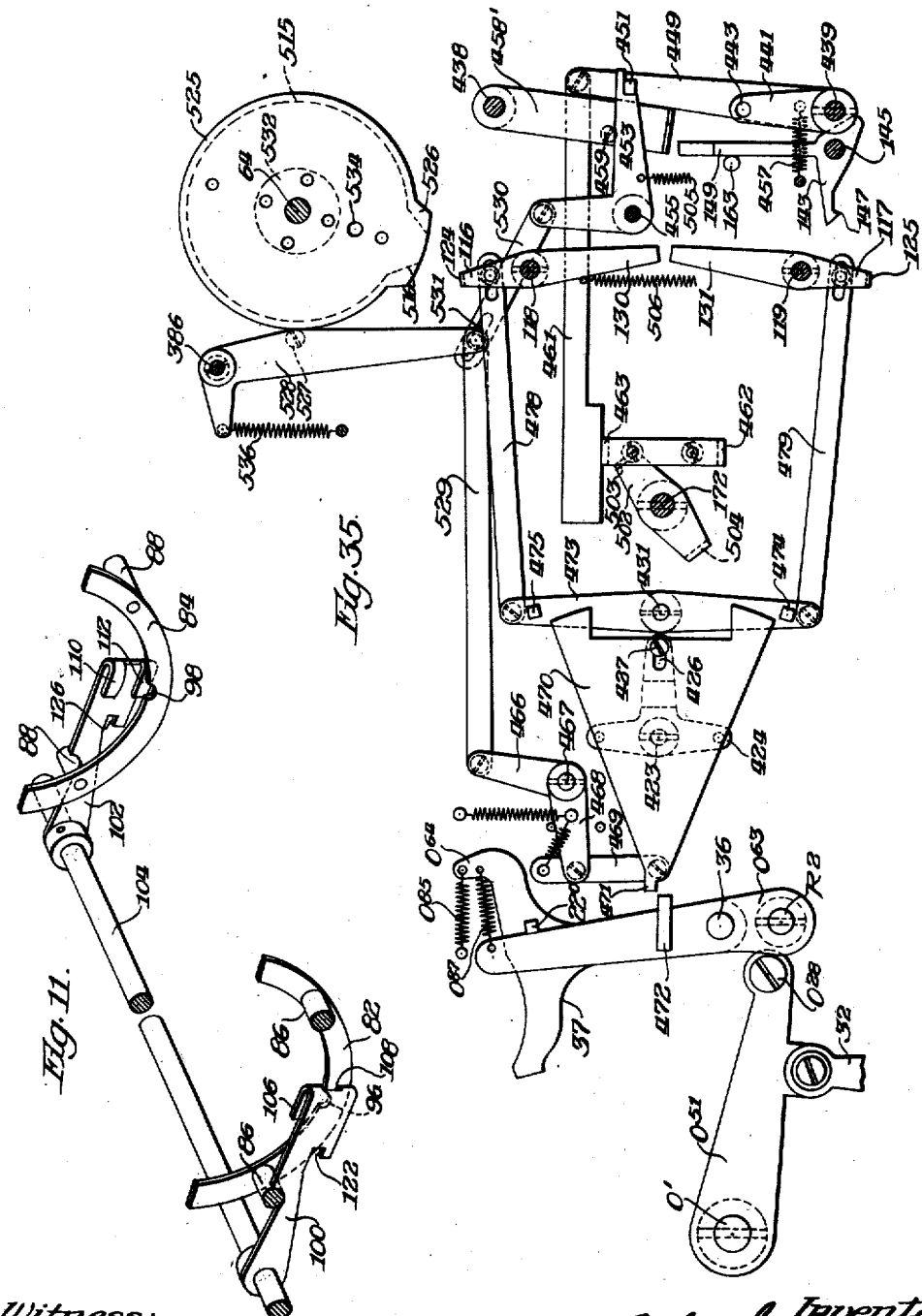

March 14, 1933. J. G. DUNKER 1,901,153
BOOKKEEPING MACHINE
Filed Sept. 8, 1924 17 Sheets-Sheet 9
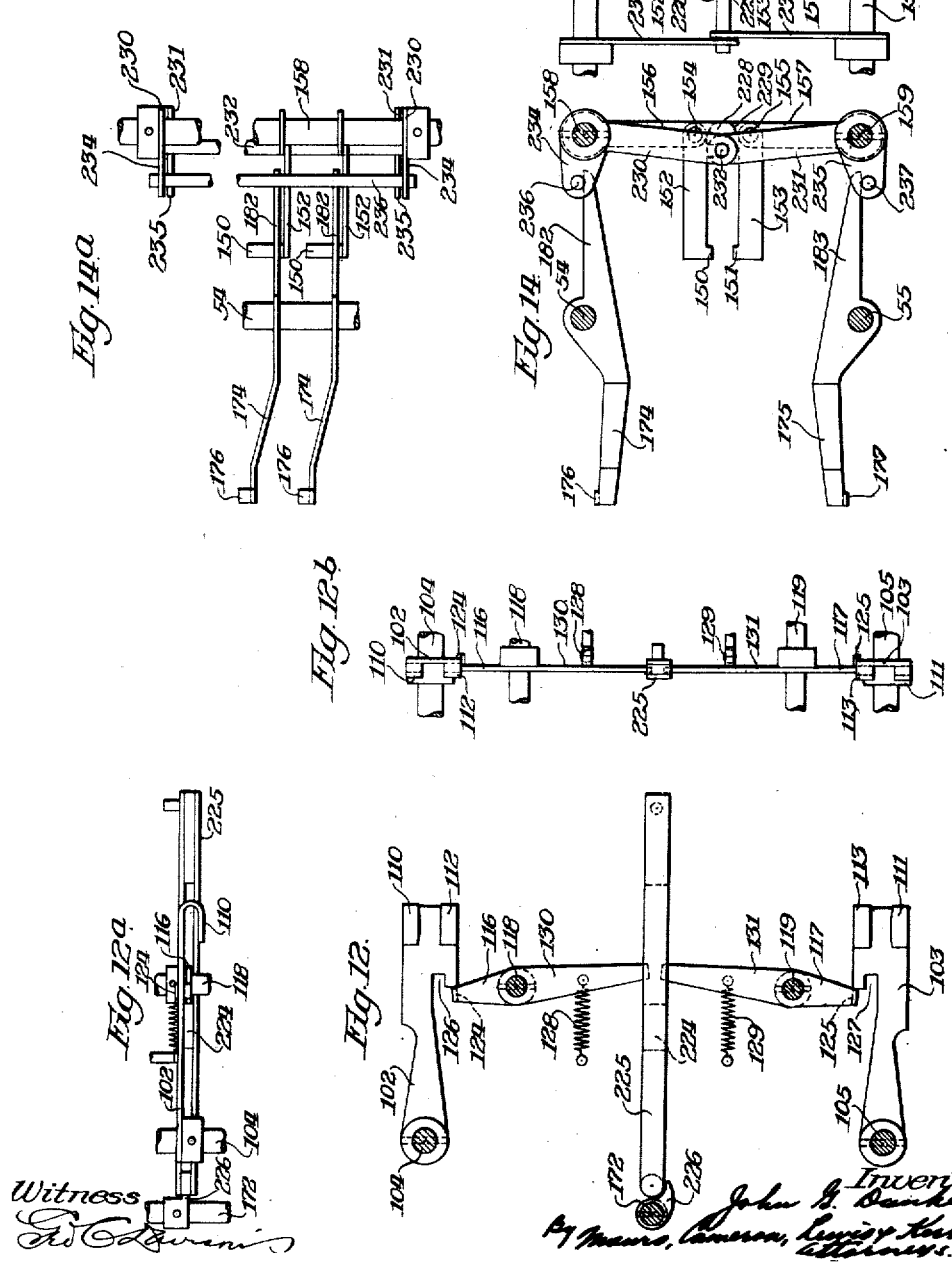

March 14, 1933. J. G. DUNKER 1,901,153
BOOKKEEPING MACHINE
Filed Sept. 8, 1924 17 Sheets-Sheet 10
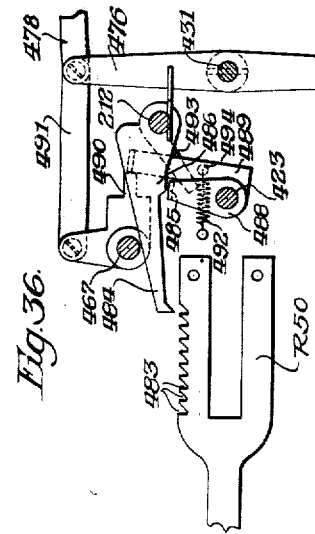
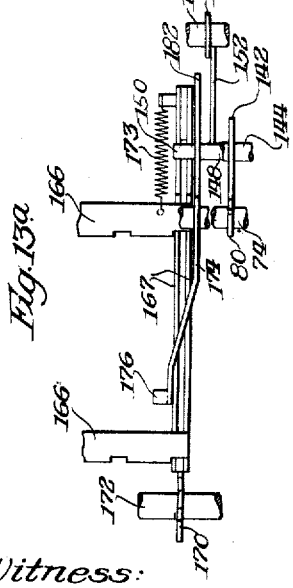
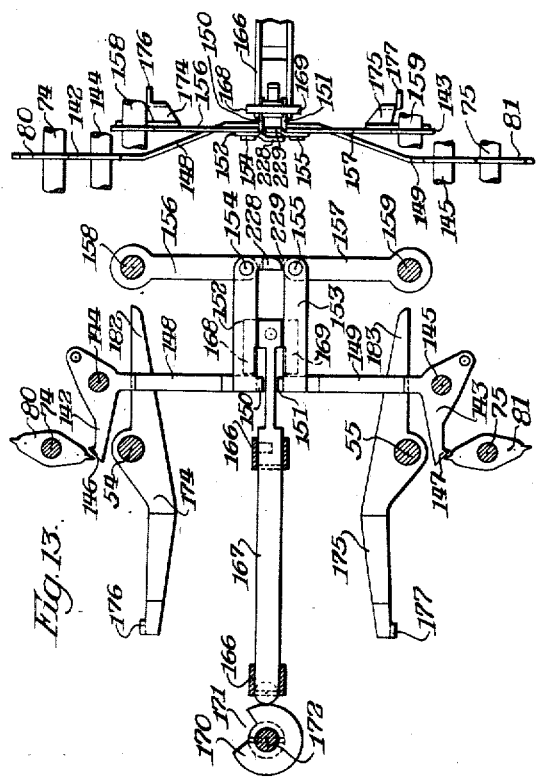

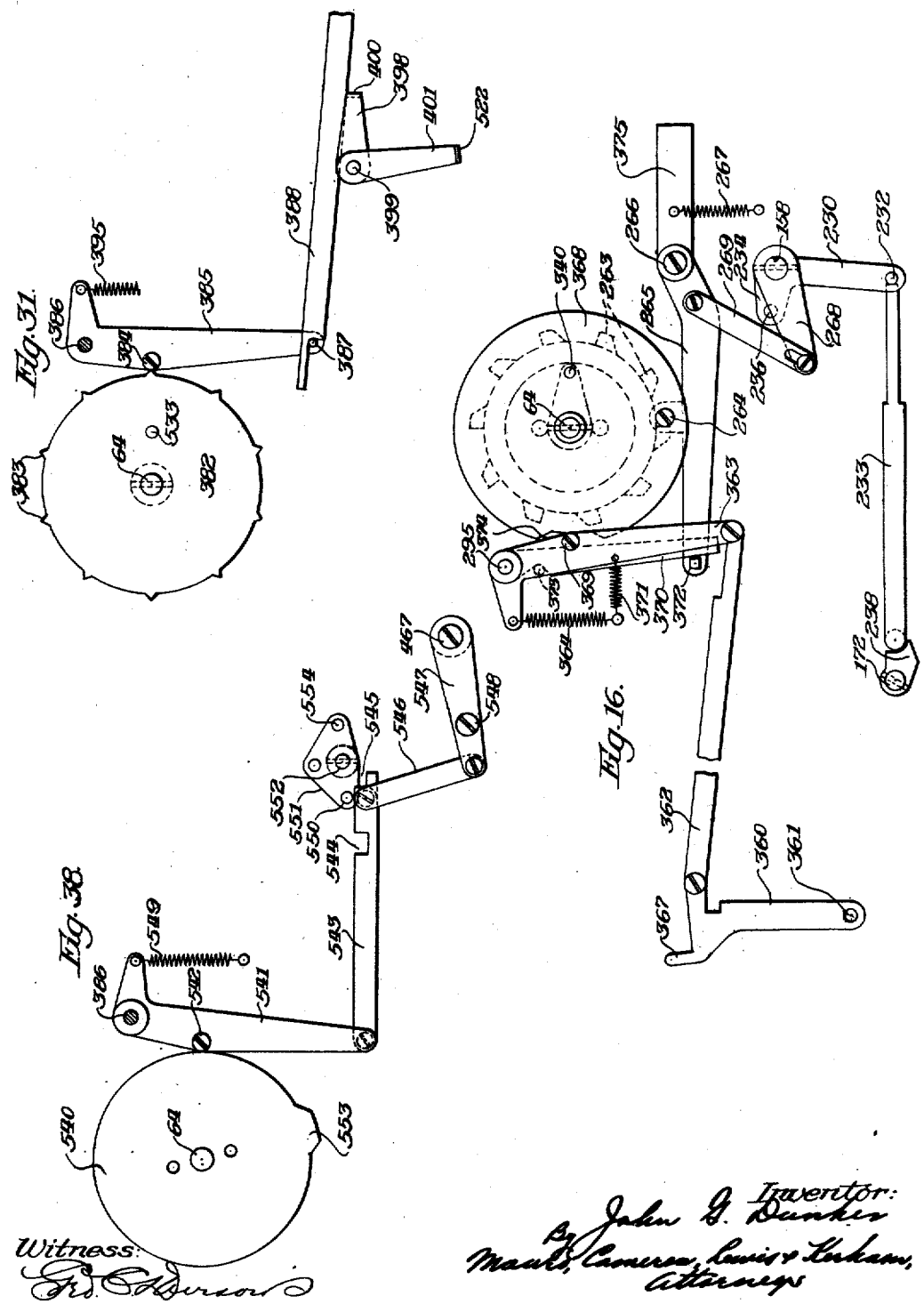

March 14, 1933. J. G. DUNKER 1,901,153
BOOKKEEPING MACHINE
Filed Sept. 8, 1924 17 Sheets-Sheet 12
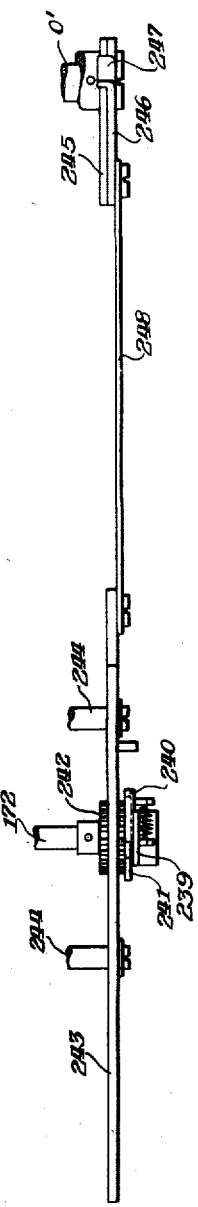
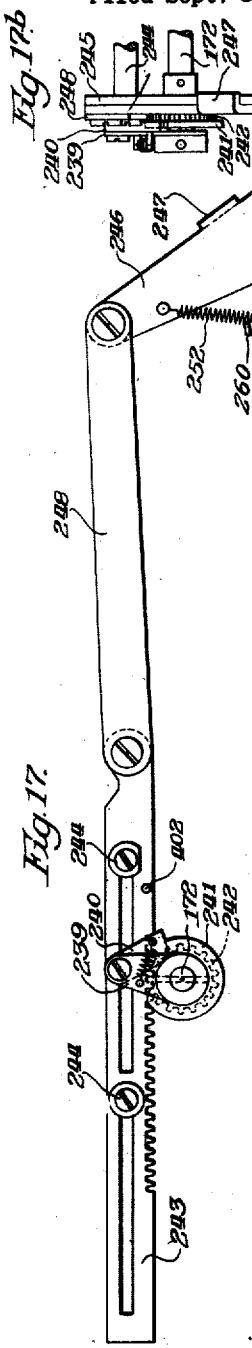
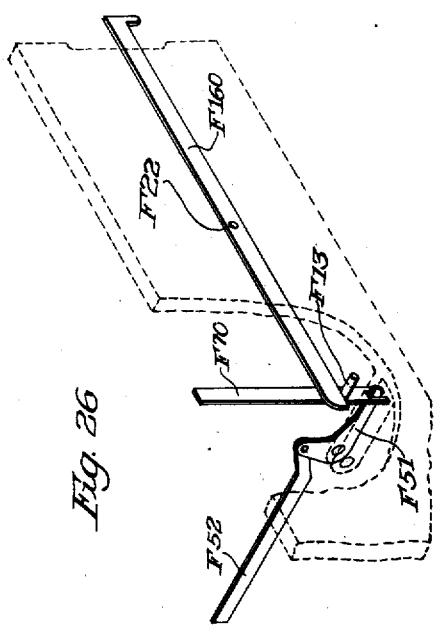

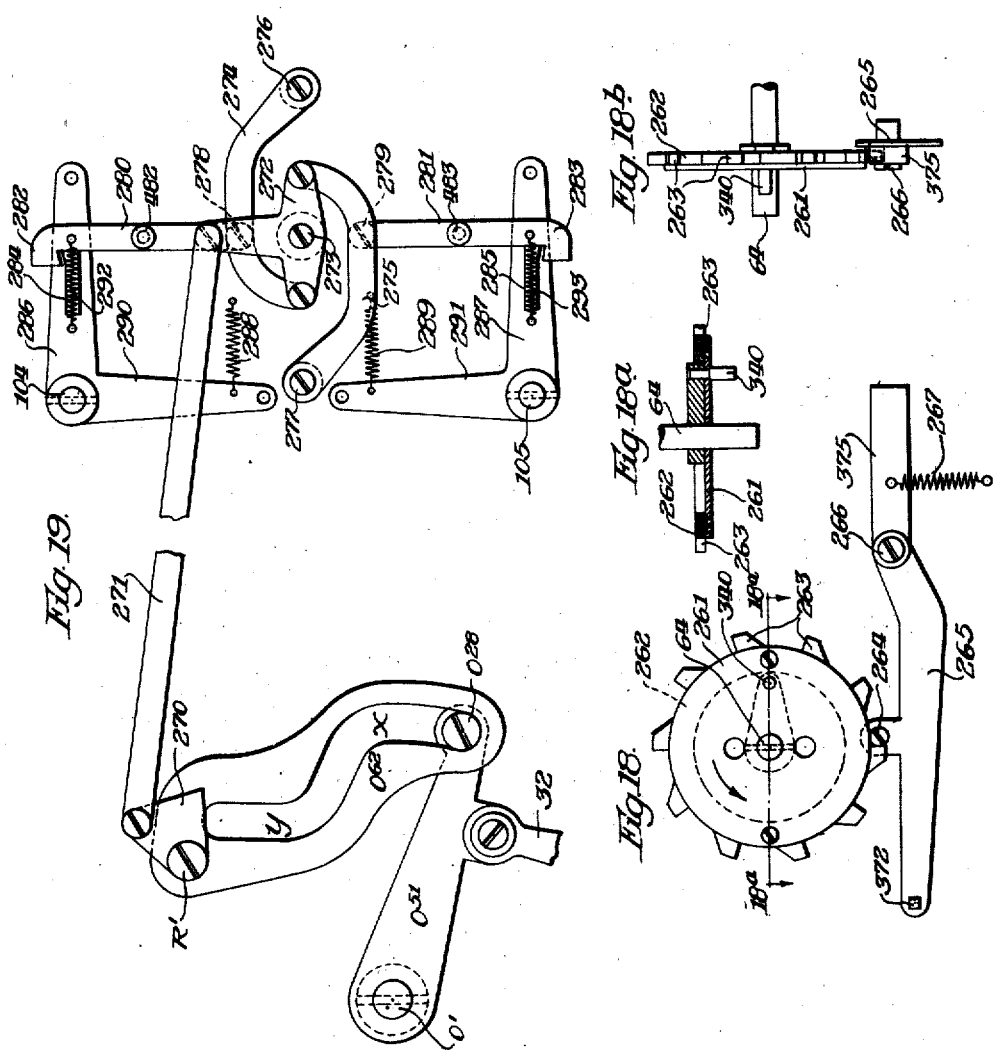

March 14, 1933. J. G. DUNKER 1,901,153
BOOKKEEPING MACHINE
Filed Sept. 8, 1924 17 Sheets-Sheet 14
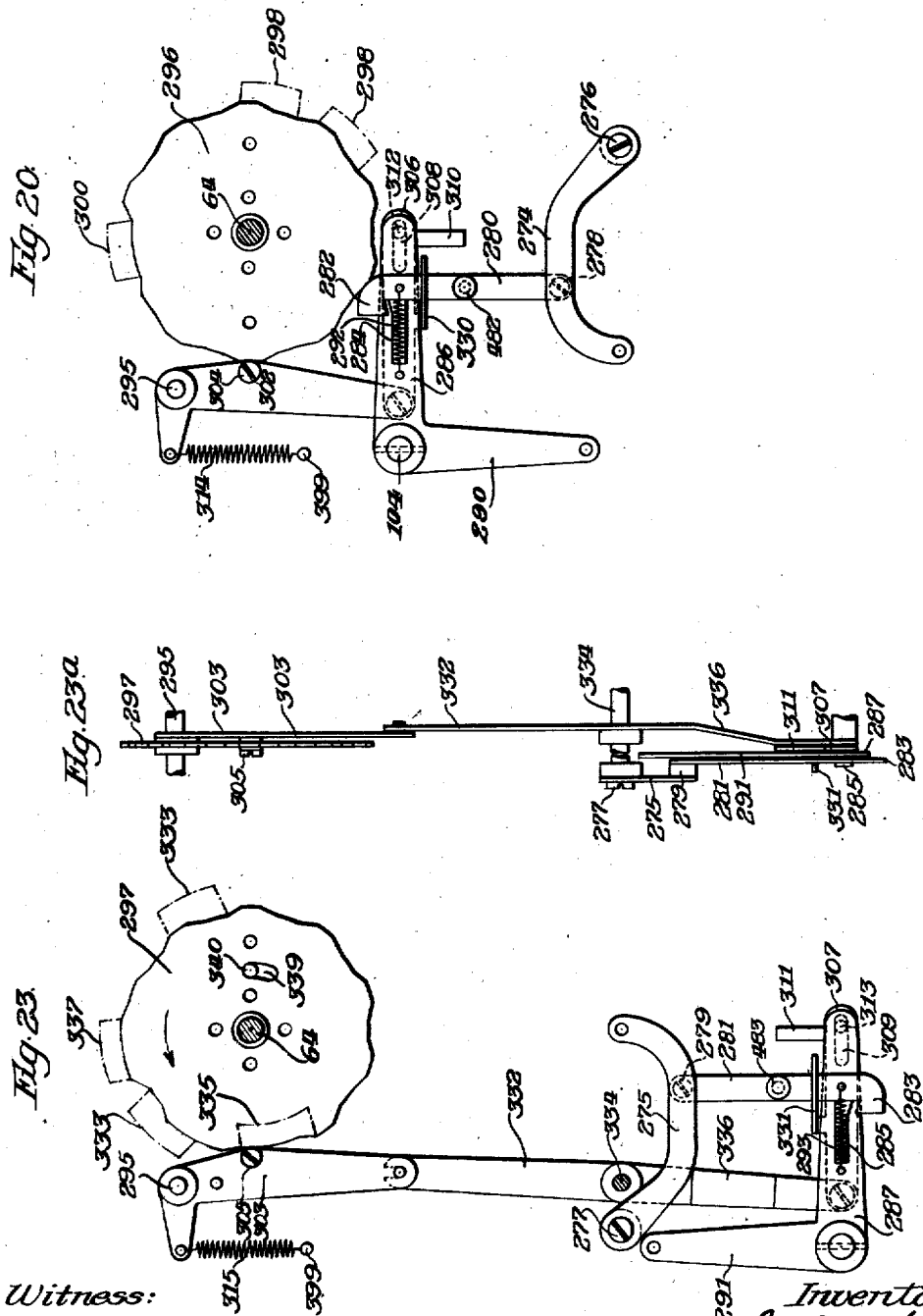

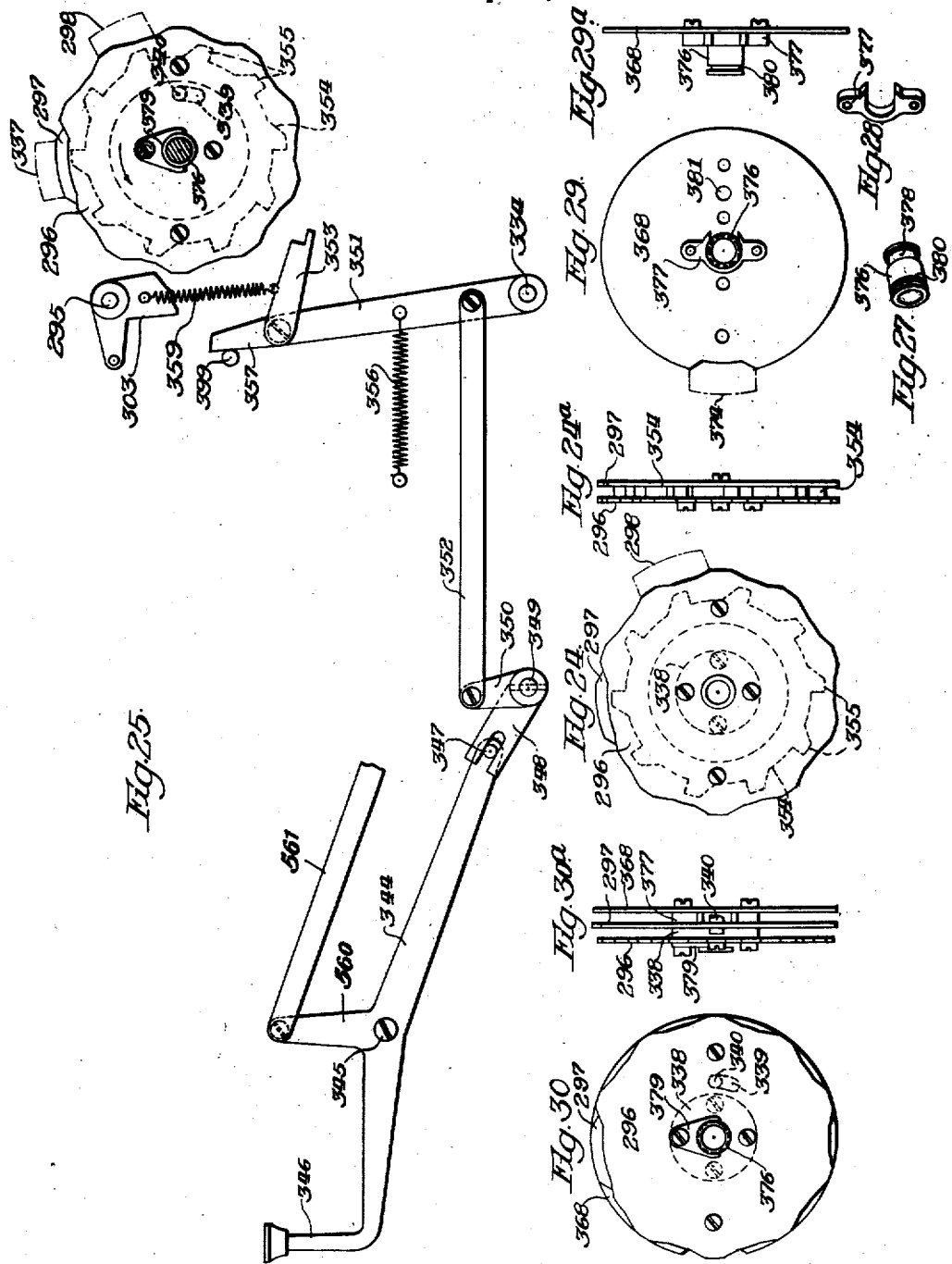

March 14, 1933.    J. G. DUNKER    1,901,153
BOOKKEEPING MACHINE
Filed Sept. 8, 1924    17 Sheets-Sheet 16
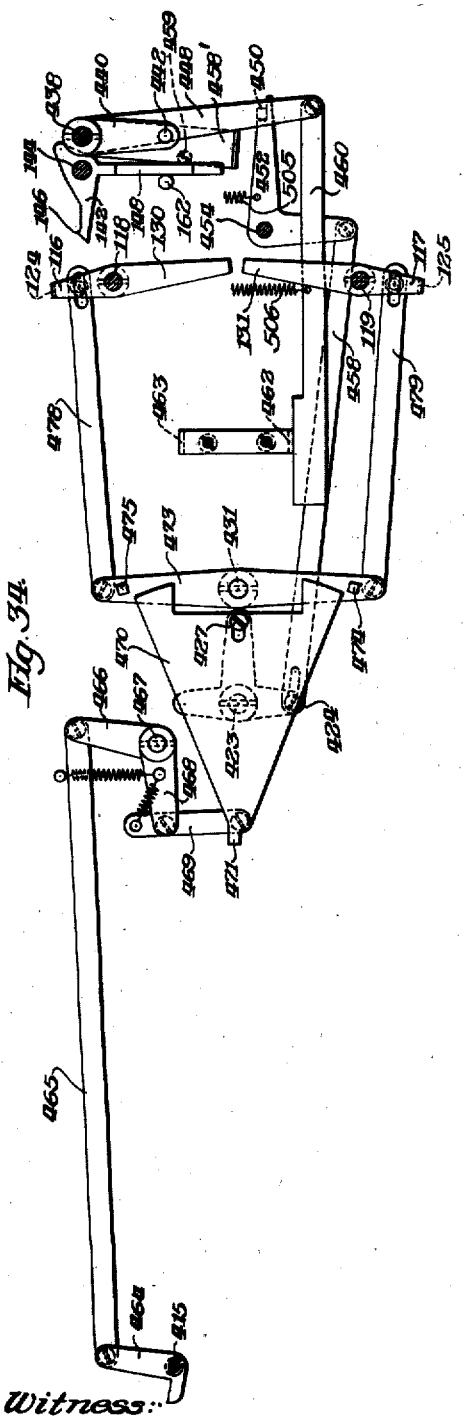
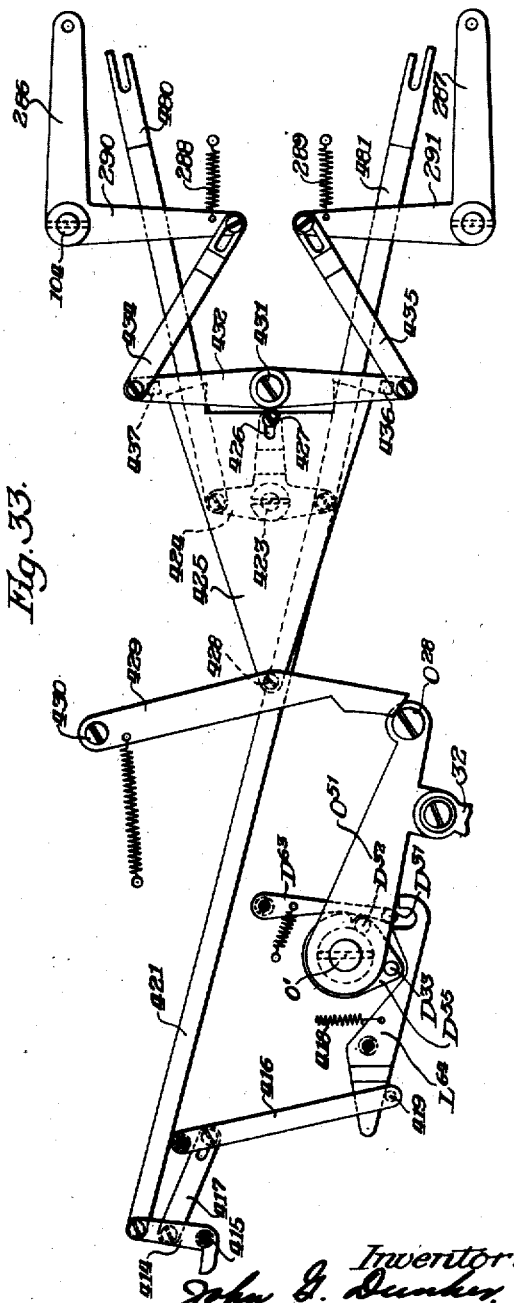

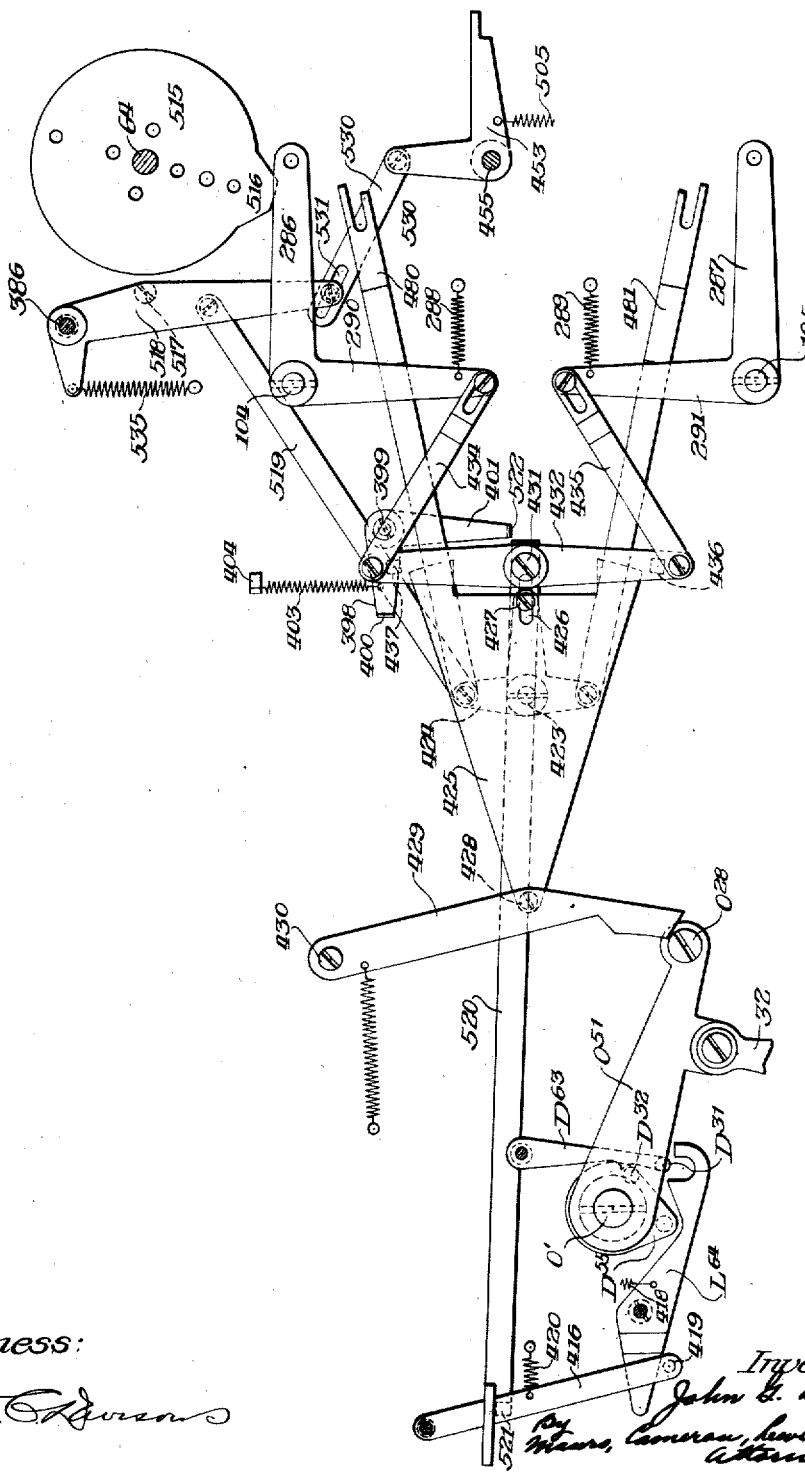

Patented Mar. 14, 1933												1,901,153

UNITED STATES PATENT OFFICE

JOHN G. DUNKER, OF CHICAGO, ILLINOIS, ASSIGNOR, BY MESNE ASSIGNMENTS, TO THE NATIONAL CASH REGISTER COMPANY, OF DAYTON, OHIO, A CORPORATION OF MARYLAND

BOOKKEEPING MACHINE

Application filed September 8, 1924. Serial No. 736,645.

This invention relates to a combination computing and typewriting machine. For convenience of illustration and description, the mechanism comprising the present invention has been incorporated in the structure of the Ellis adding-typewriter, which latter is described and illustrated in the U. S. patent to H. Ellis, No. 1,197,276, dated September 5, 1916.

The invention consists, among other things, in providing an improved combination computing and typewriting machine, and in providing improved means for computing.

Other objects of the invention are to provide a combination machine of this type of simplified construction; to provide a plurality of accumulators, arranged in groups, that are adapted to be operated by a plurality of actuators common to the several accumulators, in a novel manner; to provide novel means for controlling one of said accumulators and its respective actuator, whereby the wheels of said accumulator are automatically returned to zero position for a total, or said wheels are automatically returned to zero position, and then back to normal position, for a sub-total.

Preferably, the actuators and the accumulators of the present invention are so arranged that one group will compute vertically the numbers printed across the worksheet, and another group will compute said numbers horizontally.

Another object of this invention is to provide control means comprising a plurality of disks. These "control disks" operate in such a manner that the machine automatically adds, subtracts, or non-computes; and totalizes, or subtotalizes. The "control disks" also constitute means for locking the elements of the machine against operation between printing positions and for controlling the colors of the printing ribbon.

Other features and advantages will hereinafter appear.

In the accompanying drawings, which in some instances are somewhat diagrammatic, and for clearness and simplicity, are not true sections of the embodiment of the invention illustrated, Fig. 1 is a right side elevation showing the general arrangement of the improved machine, and particularly the clutch mechanism and the parts outside the vertical side frames to which the cross-members of the machine are attached;

Fig. 2 is a left side elevation showing the parts outside the vertical side frames, with said parts in their normal positions.

Fig. 3 is a side elevation of the mechanism between the side frames, viewed from the right side, and with certain parts omitted in the interest of clearness;

Fig. 4 is a vertical, longitudinal section, showing the typewriter action;

Fig. 5 is a detail side elevation illustrating the actuators, with the parts in their normal positions;

Fig. 5a is a section taken on line 5a—5a of Fig. 5;

Figs. 5b, 5c, 5d, and 5e are perspective views illustrating details of the coupling mechanism that may be provided for the slides and racks;

Fig. 6 is a side elevation, partly in section, showing one arrangement of the actuators, accumulators, and carrying mechanism;

Fig. 7 is a detail end view illustrating one means that may be employed for reversing the direction of rotation of the accumulating wheels, and Fig. 8 is a similar view illustrating another type of means which may be employed if desired;

Fig. 9 is a detail side elevation partly in section, of the accumulator locking mechanism, and Fig. 9a is an end view of the parts illustrated in Fig. 9;

Fig. 10 is a perspective illustrating an accumulating wheel and one type of cam that may be employed for carrying and totalizing;

Fig. 11 is a detail perspective of the accumulator engaging mechanism;

Fig. 12 is a detail view illustrating the accumulator locking and releasing mechanism. Figs. 12a and 12b are a plan and an end view, respectively, of the parts illustrated in Fig. 12;

Fig. 13 is a detail side elevation of the carrying-tens mechanism with the actuators omitted, while Figs. 13a and 13b are a top plan view and an end view, respectively, of the parts illustrated in Fig. 13;

Fig. 14 is a detail side elevation of the carrying-tens restoring mechanism, while Figs. 14a and 14b are a top plan view and an end view, respectively, of the parts illustrated in Fig. 14;

Fig. 15 is a detail side elevation of the actuator coupling mechanism, while Figs. 15a and 15b are a top plan view and an end view, respectively, of the parts illustrated in Fig. 15;

Fig. 16 is a detail side elevation of the aligning and releasing mechanism for the accumulators of the upper group. This view also discloses one type of means which may be employed for automatically actuating the escapement of the paper carriage;

Fig. 17 is a detail side elevation illustrating means for actuating the carrying mechanism, for releasing the accumulators, for restoring the carrying mechanism, and for releasing the upper accumulator reel; while Figs. 17a and 17b are a top plan view and an end view, respectively, of the parts illustrated in Fig. 17;

Fig. 18 is a detail side elevation of the aligning mechanism for the upper group of accumulators; Fig. 18a is a section taken on the line 18a—18a of Fig. 18, and Fig. 18b is an end view of the parts illustrated in Fig. 18;

Fig. 19 is a detail side view illustrating one type of means that may be employed to engage the accumulators with their respective actuators;

Fig. 20 is a detail side view of the computing control mechanism for the upper actuator;

Fig. 21 is a detail end view, certain parts being broken away, of the gear wheel shifting mechanism, while Fig. 22 is a perspective detail of the left-hand portion of Fig. 21;

Fig. 23 is a detail side view, similar to Fig. 20, illustrating the computing control mechanism of the lower actuator and Fig. 23a is an end view of the parts illustrated in Fig. 23;

Fig. 24 is a detail side view of the upper and lower computing control disks shown in Figs. 20 and 23, while Fig. 24a is an end view of the parts illustrated in Fig. 24;

Fig. 25 is an assembly view, in side elevation, of the means for reversing the computing operation of the machine;

Fig. 26 is a detail perspective of the paper carriage tabulating mechanism for disengaging the escapement;

Figs. 27 and 28 are perspective views of a sleeve and key, respectively, that may be employed for assembling the control disks;

Fig. 29 is a detail side view of the disk shown in Fig. 16 assembled with the sleeve and key illustrated in Figs. 27 and 28, and Fig. 29a is an end view of the parts illustrated in Fig. 29;

Fig. 30 is a detail side view of the disks illustrated in Figs. 16, 20 and 23 assembled in a group, and Fig. 30a is an end view of the parts illustrated in Fig. 30;

Fig. 31 is a detail view of a portion of the mechanism that is provided to release and to lock the operating bar;

Fig. 32 is a perspective view of means which may be employed for moving the numeral key releasing bar;

Fig. 33 is a side view of the manual means for engaging the aligned upper accumulator with the upper actuator during totalizing operation;

Fig. 34 is a side view of the manual releasing and locking mechanism for the upper accumulator that is actuated during totalizing operation;

Fig. 35 is a side view of the automatic releasing and locking mechanism for the upper accumulator that is actuated during a totalizing operation;

Fig. 36 is a detail side view of mechanism for locking the actuators during a totalizing operation;

Fig. 37 is a side view of automatic means for engaging the aligned lower accumulator with its actuator during a totalizing operation, and Fig. 38 is a detail side view of mechanism to control the printing ribbon.

1. Clutch mechanism

Illustrated particularly in Fig. 1.

In the Ellis patent referred to, the machine is operated by a handle and in the present machine, by an electric motor. Referring to Fig. 1, an operating bar 1 is connected to a circular piece 3 by a short link 2 and to a three-armed lever 6 by a long link 5. The circular piece 3 is pivoted to the side frame B46 on a pivot 4 and the lever 6 on a pivot 7. A stud 8 projecting from an arm 9 on the lever 6 engages a slot 10 cut in a clutch-detent 11, pivoted at 12 on the clutch housing 600. Depression of the operating bar 1 disengages the stud 8 from the slot 10 and a spring 13 elevates a lug 14, formed on the rear end of the clutch-lock 11, to release a lever 15, which lever is pivoted at 16 to a revolvable disk 17 journalled on a short shaft 18 projecting from the clutch housing. One end of a steel clutch band 19 is secured to the disk 17 and the other end is connected to the lever 15 by a stud 20 projecting inwardly from said lever.

Continuously rotated by a motor, (not shown), is a shaft 21 and a worm 22, which worm meshes with a worm-gear 23 journalled on the short shaft 18 and having an annular flange 24 to house the steel-clutch band 19. When the lever 15 is released the steel-clutch band is forced against the inner wall of the ring 24 by a spring 25 connected to said lever and a stud 26 in the disk 17. This friction clutch rotates about the short shaft 18 until the lever 15 is arrested by the lug 14. To reset the clutch lock 11, an adjustable stud 27 secured to the revolvable disk 17 engages with a cam 28 formed on the clutch-lock as the disk rotates. This action forces the slot end of the clutch-lock up and the stud 8 engaging the slot resets the clutch-lock until the operating bar 1 is again depressed. The circular piece 3 and the three-armed lever 6 are moved to their normal positions by a spring 29, as shown in Fig. 1. With the clutch-lock reset, the lever 15 abouts on the lug 14 and disengages the steel-clutch band 19 from the wide ring 24, of the rotating worm-gear 23. A latch 30 mounted on the clutch housing prevents recoil of the clutch mechanism by holding the stud 27, while a block 31 projecting from the base B45 limits the downward movement of the clutch-lock 11 when said clutch-lock is released from the stud 8.

A drive link 32 connects this clutch with the mechanism of the machine so that one revolution of the worm-gear 23 makes a complete operation of the machine.

2. Typewriting mechanism

Illustrated particularly in Figs. 1 and 4.

S designates a platen, rotatably mounted in a laterally moving frame C45, which hereinafter, as a unit, is termed the paper-carriage. The paper-carriage is moved step by step in one direction by a spring and an escapement, as is usual in typewriting-machines. Means are hereinafter described to manually and automatically disengage the escapement to permit the paper-carriage to tabulate from one printing position to another through a plurality of letter spaces at a time.

The typewriter mechanism in this machine comprises a three-piece type movement, clearly shown in Fig. 4. The key lever T68, in this case, a lever of the first class, is pivoted at T94, in a suitable slotted fulcrum bar T47, secured to the base B45. This pivot T94, is at an intermediate position between the key top at the forward end, and a roller T41 at the rear end of the lever T68. This roller T41 traverses a cam slot in the lower end of an intermediate lever T67, which is pivoted in a horizontal slotted bar T48, on a wire T91 extending across the series of slots in the bar T48. The upper end of the intermediate lever T67 carries a projection T17 which travels in a slot in the heel of a type-bar T66 is pivoted at T92 in a slotted type bar segment T45, which also supports the type-guide T75.

The depression of a key lowers the forward end of the lever T68 and elevates the roller T41 which working in the cam slot at the lower end of the intermediate lever T67, rocks the last-named lever and its projection T17 in counter-clockwise direction. The projection swings the type-bar T66 from its position of rest, as shown in Fig. 4, until the type on its fore-end strikes the platen S. The bar T48, for supporting the pivot T91 of the intermediate levers T67, extends between and is secured at its opposite ends to the side frames B46 and B47. The key levers T68 are held in, and restored to, their normal positions, by springs T80 extending between the lower edges of said levers and suitable adjusting screws in the base B45. The intermediate levers T67 operate a universal bar E62, on the depression of the keys, and the universal bar is connected to operate an escapement for the paper carriage in the usual manner.

3. Number printing device

Illustrated particularly in Figs. 1, 3, 19 and 35.

The keyboard comprises denominational rows of keys K51 to K59, representing the numerals "1" to "9". From each keystem K51 to K58, inclusive, projects a stud K23 to differentially arrest a slide R50. The slide R50 moves back and forth in the machine supported on a stationary cross rod K3, extending across the machine under the keyboard, and past a cross-bar R92 embraced by the rear forked end of the slide; both the rod K3 and the bar R92 being provided with suitable grooves in which the slide R50 can move; the grooves serving as guides to maintain the slide R50 in its vertical position. On the upper edge of the slide R50, beginning near the front end, are a series of graduated steps which serve as the abutting surfaces to engage the series of key studs K23. The various steps on the upper edge of the slide R50, are so arranged that each step engages a particular one of the studs K23, which latter are also arranged at different heights or in a step formation. The key studs K23 arrest the slide R50 at different points in its travel; for instance, the engagement of the slide R50 with the stud K23 on the keystem K51, arrests the slide R50 after the latter has moved to the rear a distance of one step which is equivalent to the distance between two adjacent types of the printing type-sector P54. If for instance, the keystone K54 is depressed, the slide R50 will move to the rear until it engages the stud K23 on the keystem K54, and there will be a movement of four steps to position the "4" type of the printing type-sector at the printing line.

The stud K23 on the keystem K59, does not serve as a stop to arrest the movement of the slide R50; however, a shoulder 33 formed on the under side of the slide R50, at the front end, abuts the rod K3 when the keystem K59 is depressed. The slide R50 is subjected to the influence of a spring (not shown), as described in the Ellis patent, or by some other suitable means, caused to move rearward upon the operation of the machine after any one of the keystems K51 to K59, inclusive, are depressed. There are a series of these slides R50 equally spaced apart on the rod K3 and the cross-bar R92 corresponding to the position of the different rows of keystems of the keyboard.

Mounted on a shaft R1, located above the slide R50, is a three-armed lever R45, one arm extending rearward and provided with a stud 15R, and the arm extending downward is provided with a segmental rack R52. A stud R14 on the rack R52 extends to the left and enters a vertical slot in the slide R50, as clearly shown by the dotted lines in Fig. 3, so that any movement, backward or forward, of the slide R50, will cause a rotation about the shaft R1, of the three-armed lever R45, corresponding in extent to the extent of the travel of the slide R50. From the rear arm of the lever R45, a connecting link P53 extends from the stud 15R to a stud P10, in a type-sector P54. This type-sector is pivoted at P11 so that it can be rotated in a vertical direction. There being ten positions in which the slide R50 can be located, there are correspondingly ten types on the type-sector P54. Inasmuch as the pivot P11 is connected to an arm 52P, which can swing about a shaft P1, it is evident that after the type-sector P54 is swung upward until the proper type comes into position, a movement of the arm 52P, about shaft P1, in the direction of the platen S, will cause the selected type of the type-sector P54 to strike the platen S and print on record material carried thereon. This movement of arm 52P occurs at the proper time and is controlled, during the operation of the machine, by the swinging of an arm 060 (Fig. 1), secured to the shaft P1. One of these three-arm levers R45, is provided for each of the slides R50, the lower arm, in each case, extending down vertically along side of the slide R50, and the horizontal arms to the front and rear converge to the width of the group of closely positioned printing type sectors of the printing section in the manner usual in this class of machine, in this way reducing the width of the printing section from the distance between the extreme outside rows of keys on the keyboard to the width of the columns of the record material.

The selection of the type to be printed is dependent upon the differential adjustment of the slide R50, and a more accurate adjustment than the studs K23, on the keystems K51 to K58, inclusive, and the shoulder 33 on the rack R50, is desirable; therefore, a bar R93, (Fig. 3), called the aligning bar, is mounted upon arms R44 secured to a shaft R2. Just prior to the time when the printing is to take place, the aligning bar is raised and enters between the teeth of the rack R52. This brings the three-armed lever R45 to a definite location within the limits of the lost motion between the connecting link P53, the stud 15R and the pivot P10, and as there are a series of these type-sectors P54 and a series of levers R45, the aligning bar R93 will bring all of the types to a predetermined alignment relatively to the record material.

To the shaft R1 there is secured a restoring bail 45R, which extends across the machine under the slides R50, and in the normal position of the machine, said bail holds the three-armed lever R45 from rotating. With no provisions to the contrary, if the bail 45R is moved away from the racks R52, as is the case when the shaft R1 rotates, the three-armed levers R45 will follow, due to the spring action previously referred to, carrying with them their respective slides R50. For each slide R50, a slide-lock 68K, well-known in the Ellis type of machine and supported by the keyboard mechanism, is normally spring-pressed into the path of a shoulder 34 formed on the under edge of the slide and is swung clear of said shoulder when a keystem in the corresponding row is depressed and the machine is operated.

To set the mechanism in motion to cause the printing of a number set up on the keyboard, the drive link 32, (Fig. 1), described as being connected to the clutch mechanism, is pivoted at 35 to the revolvable clutch disk 17 and to an arm 051 secured to a drive-shaft 01. The arm 051 carries a roller 028, which traverses a cam slot 501 formed in an arm 062 secured to the end of the shaft R1, (see also Fig. 19). This cam slot 501 is designed, so that the distance from the lower end of the slot to the point marked "X" is made concentric with the center of the shaft 01. As a result, the movement of the arm 051, from its position shown in Fig. 1 until the roller 028 comes to the place marked "X", will not cause any rotation of the shaft R1. From "X" to the place marked "Y" the cam slot is not concentric with the shaft 01, and the roller 028 rocks the arm 062 rearward. In this position, that portion of the cam slot 501 between the letter "Y" and the upper end of the slot is again concentric to the shaft 01. From this, it will be readily seen that the movement of the roller 028 is co-incident with the rotation of the shaft 01, but the rotation of the shaft R1 takes place in the middle of the movement of the shaft 01, there being a dwell in the movement of the cam 062, both at the beginning and at the end of the time during which the shaft 01 is moving.

During the time the roller 028 moves between "X" and "Y", the bail 45R is moved away from the three-armed levers R45, and the slides R50 either follow their respective levers R45 or are held in their normal positions by the slide-locks 68K (Fig. 3).

Referring to Figs. 1 and 35, upon the right-hand end of the shaft R2 is secured an upright arm 063 and pivoted to said arm at 36 is a floating cam 064 having a cam-surface 37. The arm 063 and the floating cam 064 are held in their normal positions (Fig. 35) by a spring 087, which normally maintains a stud 220, projecting from the floating cam 064, in contact with the rear edge of the arm 063. The cam-surface 37 of the floating cam 064 extends into the path of travel of the roller 028 when it moves between the point marked "Y" and the upper end of the cam slot 501, and as the roller 028 wipes along the cam edge 32, it rocks the floating cam 064 and its arm 063 rearwardly to impart a slight rotation to the shaft R2, thereby causing the aligning bar R93 to perform its function. The object of making the floating cam 064 separate from the arm 063, and connecting the two by the spring 087, is to provide a yielding connection to operate the aligning bar R93; it always being possible that this aligning bar may strike one of the teeth of the racks R52, end on, and if there is no flexible connection between the floating cam 064 and the aligning bar R93, injury will result to the machine. The floating cam 064 is held in its normal position by a suitable spring 085.

4. Upper and lower actuators

Illustrated particularly in Figs. 1, 2, 3, 5, 6, 7 and 8.

The machine as heretofore described is substantially that shown in the Ellis patent, and the present invention is illustrated and described as being applied to the machine of that patent. It will, however, be understood from the description that is to follow, that this invention might be applied to and used in connection with machines of other types.

The particular construction and operation of the present improvement and its relation to and co-action with the machine heretofore described will be fully understood from the following description.

To each slide R50, at the rear forked end, is coupled an upper rack 40 and a lower rack 41. The mechanism of the coupling is such that as a slide R50 moves rearward to position the selected type of its type-sector at the printing line, the racks 40 and 41, coupled to said slide, move a corresponding number of steps to represent the amount to be computed. United with the upper rack 40 and the lower rack 41 are racks 42 and 43, respectively, the racks 40 and 42 and the racks 41 and 43 being joined together to move in pairs. The auxiliary racks 42 and 43 are laterally offset from their respective upper and lower racks 40 and 41 as clearly shown in Fig. 7.

Each upper pair of denominational racks 40 and 42, is provided with two axially shifting gear-wheels 44 and 46, rotatably mounted on a shaft 50 that is slidably supported by side frames 66, 67 (Figs. 1 and 2). The gear-wheel 44 meshes with the upper rack 40 and the gear-wheel 46 meshes with the auxiliary rack 42 at all times. These gear-wheels 44 and 46 may be shifted by moving shaft 50 longitudinally in either direction, to bring said wheels in mesh with a pinion 52 rotatably mounted on a shaft 54, also mounted in the side frames 66, 67. If the pinion 52 is meshed with the gear-wheel 44 its rotation will be the reverse of its rotation when it is in mesh with the gear-wheel 46. Each lower pair of denominational racks 41 and 43, is provided with the same gearing, and the parts carry odd-numbered reference numerals to distinguish them hereinafter. The teeth of the shifting gear-wheels are preferably chamfered at their ends to assist in passing freely from one position to the other.

Another mode of changing the rotation of the pinions 52 is shown in Fig. 8; only one shifting gear-wheel 44 is used to each pinion 52, and the teeth of the gear-wheels may be chamfered at their ends to assist in passing freely from one rack to the other.

The upper racks 40 and the lower racks 41 are separated by transversed plates 56 (Figs. 3 and 5) secured to rods 57, which rods extend between the side frames 66, 67, and in this manner divide this part of the machine into two actuators, the racks 40, 42, gears 44, 46 and pinion 52 constituting the upper actuator, and the racks 41, 43, gears 45, 47, and pinion 53 forming the lower actuator. Slotted plates 58 secured to cross-bars 60 support the upper pairs of racks 40, 42, and plates 59 secured to cross-bars 61 support the lower pairs of racks 41, 43. Shafts 62, (Fig. 3), extending between the side frames, hold the upper racks 40 and 42 united, for concurrent reciprocation, and corresponding shafts 63 likewise hold together the lower racks 41 and 43.

5. Upper and lower groups of accumulators

Illustrated particularly in Figs. 1, 2, 3, 9a, 10, 11, 12, 12a and 12b.

Above this actuator mechanism just described, is a shaft 64, (Fig. 3), rotatably mounted in the side frames 66 and 67, and on said shaft is mounted a pair of circular cheek plates 68 and 70, (Fig. 9a), preferably pinned to said shaft to form a reel for one group of accumulators. Each of these cheek plates is provided with a plurality of slots 72, and ten of said slots are shown in the upper reel. The opposite ends of an accumulator shaft 74 are slidably mounted in each pair of opposed slots and a plurality of accumulating wheels 76 are carried by each accumulator shaft. Each shaft and its plurality of accumulating wheels constitute an accumulator, the accumulating wheels being separated by sleeves so that each denominational accumulating wheel aligns with its respective denominational pinion 52. To prevent endwise movement of the shaft 74, the slots 72, in the plates 68 and 70, are made smaller in width, than the diameter of the shaft, and grooves (Fig. 9) are cut into the shafts 74 to accommodate the walls of the slots 72.

A toothed detent bar 78 extends between the cheek plates 68, 70 and adjacent each opposed pair of slots 72, in position to engage between two of the teeth of each of the accumulating wheels 76, so that said wheels are normally held against rotation on their shafts 74 and in alignment. Each accumulating wheel is provided with twenty teeth, and secured to the left-hand side of the same is a two-point cam 80, (Fig. 10). This cam turns with the accumulating wheels in the usual manner for the purposes of carrying borrowing, and for totalizing, as will be hereinafter more fully described.

The ends of each shaft 74 project beyond the circular plates 68 and 70 and are confined in their slots 72 by the inner peripheries of abutment rings 82 and 84, (Figs. 3 and 9a) the former ring being secured to the side frame 66 by posts 86, and the latter to the side frame 67 by posts 88, (Fig. 11). These rings act to hold the shafts 74 in position at the inner ends of the slots 72 and the accumulating wheels in engagement with the detent bars 78. The ends of said rings are separated a sufficient distance at the top, (see Fig. 1, showing the ring 82), to permit the introduction and removal of the various shafts 74 into and out of their respective slots, it being understood that the reel is rotated step by step so that each pair of slots will come successively in alignment with the opening between the ends of the split rings.

The shaft 64 is always connected to the paper-carriage in order that the paper-carriage shall, as it tabulates from column to column of the work sheet, effect the step-by-step rotation of the accumulator reel in either direction. As here shown, these connections consist of a bevel-gear 90, (Fig. 3) mounted on the shaft 64, just inside the frame 67, and meshing with a bevel-gear 91 secured to one end of a shaft 92, mounted in suitable bearings projecting inwardly from the side frame 67, the other end of said shaft carrying a pinion 93, which meshes with a rack 94, (Fig. 1), secured to and travelling with the paper-carriage. The gearing, or other connections, between the reel and the paper-carriage may be such that the latter will effect one complete rotation of the reel while the paper carriage is moving from right to left, and if, as hereinafter explained, the accumulator reel is equipped with a rotary escapement arranged to enable the accumulator reel to make a complete rotation in ten steps, the printing line on the platen may be considered as divided into an equal number of printing positions, or any other relation may be had; that is to to say, more than one revolution or less than one revolution of the reel may correspond to the full movement of the paper-carriage.

Means are provided for bringing the rows of accumulating wheels 76 into engagement with the pinions 52; and it is here pointed out that, when the wheels of any accumulator are engaged with their respective pinions 52, said wheels are free to rotate while the reel as a whole is locked against rotation, whereas, when the reel as a whole is free to rotate, the wheels 76 of each accumulator are engaged with their respective detent bars 78 which lock said wheels against independent rotation on their shafts 74. The abutment ring 82 is provided at its bottom with a depression 96, (Fig. 11), and the ring 84 is provided with a corresponding depression 98, and when it is desired to engage the teeth of a row of accumulating wheels 76 with the actuating pinions 52, the shaft 74 supporting said row of wheels is lowered into said depressions to effect this engagement. Though a shaft 74 be positioned above said depressions 96 and 98, it is normally held out of engagement with the same by arms 100 and 102 secured to a totalizer engaging and dis-engaging shaft 104 rotatable in the side frames 66 and 67. The fore ends of the arms 100 and 102 are bent over upon themselves, the bent over ends being longitudinally slotted forming on the arm 100 an upper branch 106, and a lower branch 108, and on the arm 102 an upper branch 110 and a lower branch 112. These branches are so positioned that the upper edges of the lower branches 108, 112 align with the inside peripheries of the rings 82 and 84 (see dotted lines in Fig. 9) to prevent the shafts 74 from dropping into the depressions 96 and 98. The upper branches 106, under which the ends of the accumulator shafts pass as they come opposite the depressions 96 and 98, serve to press the shafts 74 into the depressions 96 and 98 and when a shaft 74 is lowered into the depressions the accumulating wheels 76 on said shaft mesh with the pinions 52 and disengage from its respective detent bar 78. From the foregoing description it will be understood that the accumulating wheels 76 may be rotated in opposite directions by shifting the gear-wheels 44 and 46. Means to automatically lower any aligned shaft 74 into the depressions at the proper time during the operation of the machine will be hereinafter described.

The means to hold the accumulating wheels 76 meshed with the pinions 52, during the necessary time to complete an operation, includes latches 114 and 116, (Figs. 9 and 9a), secured to a rotatable shaft 118 mounted in the side frames 66 and 67. On the upper end of the latch 114 is a lug 120 adapted to enter a recess 122 formed in the arm 100, and a lug 124 on the latch 116 (Fig. 12), in like manner, is adapted to enter a recess in the arm 102. A spring 128 connected to an extension 130 of the latch 116 and to a stud in the side frame 67 tends to move the upper ends of the latches 114, 116 rearward, to enter the lugs 120, 124 into their respective recesses. Under the influence of a spring 288 (Figs. 1 and 19), to be referred to hereafter, the arms 100 and 102 are held in their normal raised positions with the arm 100 resting against a post 86, so that the shafts 74 can pass freely between the branches 106, 108, during which time the lugs 120, 124 contact the unrecessed portions of the arms 100, 102.

Only three rows of accumulators 77 are shown in the lower group of accumulators and the mechanism to align the accumulators with the actuating means is as follows. Mounted on two posts 132, (Fig. 2), which project from the side frame 67, is secured a segment 133 provided with four notches 134, three of which correspond to the positions that the accumulators assume as the accumulators are aligned with the actuating pinions 53. Secured to the shaft 65 is an arm 135, provided with a dog 136 pivoted to said arm at 137. Under the influence of a spring 138 connected to said dog and arm, the dog is moved to engage the notches 134, and in the position shown in Fig. 2 the dog is engaged with the second notch which indicates that the "number one" accumulator 77 is aligned with the actuating means. When the dog 136 is released and the arm 135 is manually rocked in clockwise direction so that the dog engages the third notch, the reel shaft 65 and the parts connected thereto rotate to align the "number two" accumulator with the actuating means. If the arm 135 is rocked to engage the dog with the fourth notch, the "number three" accumulator will align with the actuating means. If it is desired to operate the machine and not use any one of the lower group of accumulators 77, the dog 136 and its arm 135 are moved to engage the first notch 134. The segment 133 is provided with stops 139 to limit the movement of the arm 135, and a stud 140 on the dog 136 limits the movement of said dog. While only three lower accumulators are illustrated and described, it will be understood that any suitable number may be employed and selected for operation.

6. Carrying mechanism

Illustrated particularly in Figs. 2, 3, 5—b—c—d—e, 6, 10, 12, 13—a—b, 14, 16 and 17.

Only the upper carrying mechanism will be described and odd and numbered reference numerals will be applied to like parts of the lower carrying mechanism to distinguish them hereinafter. As heretofore noted, the rows of accumulating wheels 76 of the upper reel may be rotated in either direction, being controlled by the meshing of the pinions 52 with the shiftable reversing gear-wheels 44 and 46. It has also been pointed out that the upper and lower pairs of racks 40, 42, and 41, 43 move to the positions representing the amount to be computed at the same time the slides R50 move to position the selected types at the printing line. When the slides R50 and the upper and lower pairs of racks return to their normal positions the accumulating wheels 76 of the set selected for operation are rotated according to the amount set-up on the keyboard and printed on the work-sheet.

During the procedure of adding, or subtracting, a series of amounts to or from the accumulators, the carrying of tens and the borrowing of tens must be considered, i. e., any transferring from one accumulating wheel 76 to another higher or lower denominational must be done automatically as is usual in computing machines. As heretofore described, each accumulating wheel carries a two-point cam 80, (Fig. 10); the purpose of which is to trip the carrying mechanism as the wheels pass from "9" to "0", or from "0" to "9".

Only a single unit of the carrying mechanism will be described, it being understood that each pair of racks, above the units racks, is provided with means to carry tens. Considering the carrying mechanism from the units to the tens denominational, a trip lever 142, (Fig. 13), loosely mounted on a trip lever shaft 144 supported by the side frames 66 and 67, extends towards the front of the machine and has at its forward end a nose 146 which projects into the path of travel of the two-point cam 80, on the units wheel 76 of any of the rows of accumulators, when said wheel is meshed with its pinion 52. The trip lever 142 is provided with a downwardly and laterally projecting extension 148 so formed that the lower end rests upon a laterally extending step 150 on a carrying pawl 152, pivoted at 154 to a depending arm 156 loosely mounted on a resetting shaft 158 supported in the side frames. In the normal position of the parts the arm 156 lies against the cross-bar 60, (Fig. 6), and the carrying pawl 152 extends parallel with the upper rack 40, of the "tens" denomination and between said rack and the units rack 40.

The step 150, on the carrying pawl 152, extends laterally under the upper rack 40 of the "tens" denomination is urged upwardly by a spring 160 (Fig. 6) connected to its carrying pawl and to the lever 156. The nose 146 of the trip lever 142 is normally pressed upwardly by a spring 180, to be described hereafter, and is held in proper alignment by the extension 148 abutting against a cross rod 162 mounted between the side frames 66, 67. Above the step 150 is a notch 164 in the upper rack 40 of the "tens" denomination, (Figs. 5 and 6). If, in this normal position of the parts, the trip lever 142 is depressed by the cam 80 of the units wheel 76, the extension 148 will swing clear of the step 150 and free the latter to the action of the spring 160, which will rock the carrying pawl 152 and its step 150 upwardly to seat the step in the notch 164 of the upper rack 40 of the "tens" denomination. If the trip lever 140 is depressed by the rotation of the units accumulating wheel 76 during the time that the racks 40 are moving to normal position, i. e., accumulating an amount set-up on the keyboard, the released step 150 will contact the under side of the upper rack of the "tens" denomination, until said rack reaches its normal position, at which time the step will seat in the notch 164. In this position, the step 150 serves as a connection to move the upper rack of the "tens" denomination to rotate the tens accumulating wheel 76 to add, or to subtract, "one" by the following means.

A horizontal carrying slide 167, (Fig. 13), the rear end or head of which is substantially T shaped, is supported by grooved crossbars 166, secured to the side frames 66, 67 between the upper and lower racks 40 and 41. The upper projection 168 of the head of the slide 167, moves over the step 150 when the latter is in its normal position and abuts against the step when the same is seated in the notch 164 of the upper rack 40 of the "tens" denomination. A cam 170, mutilated as at 171, is secured to a rotatable cam shaft 172 journaled in the side frames, and normally the unmutilated periphery of the cam holds the slide 167 rearward. When the cam shaft 172 rotates and the mutilated portion 171 of the cam aligns with the carrying slide 167 said slide is moved forward by a carrying spring 173, (Fig. 13a), and if the step 150 has been elevated into the notch 164 of the "tens" upper rack 40, the projection 168 will strike the stop and move the "tens" upper rack forward. When the "tens" upper rack 40, and with it the "tens" auxiliary rack 42, is given this supplementary movement, means are provided to lock the racks 40, 42 in their advanced positions until the accumulator 76 is released from the actuating means. Mounted on the pinion shaft 54 is a catch 174 provided at its front end with a lug 176 that extends laterally over the "tens" rack 42 to engage a notch 178 in said rack, (Fig. 6). A spring 180 connected to the rear end 182 of the catch 174 and to the trip lever 142, tends to depress the lug 176 and also serves to reset the trip lever, by rotating its forward end upwardly, when the parts are restored to their normal positions, as hereinafter explained.

It is pointed out that each pair of racks 40, 42, above the units pair of racks, is provided with the above described means to carry tens. The mutilated cams 170 are arranged on the cam shaft 172 so that the mutilations 171 successively align with the carrying slides 167 as the cam shaft rotates; that is to say, the slides 167 move forward, one at a time, the slide 167 actuating the "tens" upper pair of racks, moves first, followed by the second slide actuating the "hundreds" upper pair of racks, and so on.

As heretofore described, the upper and lower racks 40 and 41 are coupled to the slides R50. This coupling is such that the parts move together during the reciprocation of the slides R50. However, when the parts are in their normal positions of the machine, as shown in the drawings, provision is made to permit the upper and lower pairs of racks 40, 42 and 41, 43 to move independently of the slides R50.

Referring particularly to Figs. 5, 5b, 5c, 5d and 5e, and 15a, the coupling mechanism includes a coupling bar 184, provided with studs 186, 188 and 190; the stud 186 connects the bar 184 to the upper prong of the slide R50 and the studs 188 and 190 enter slots 192 and 194, (Fig. 6), in the upper rack 40. In the normal positions of the parts, there is an intermediate space 196 (Fig. 5a) between the slide R50 and the upper rack 40 and the studs 188 and 190 moving in the slots 192 and 194 permit the rack to move forward the distance of said space. Under the influence of a spring 198 connected to a removable stud 200, (Fig. 5e), which stud is mounted in a slot in the rack 40, and to the stud 190, on the bar 184, the rack 40 is normally held rearward. Pivoted to the bar 184 is a latch lever 202, provided with a lateral lug 204 adapted to enter a notch 206 (Figs. 5 and 6), in the upper rack 40 and while so connected the slide R50 and the rack 40 will move together. The latch lever 202 is also provided with an angular projection 208, and a spring 210 connected to a stud on said projection and to the stud 190 tends to snap the lug 204 into the notch 206. There is one of these couplings for each slide R50 and upper rack 40 and the lugs 204 must be disengaged from said racks when the horizontal carrying slides 167 move forward, during the time that the carrying of tens takes place. This is accomplished in the following manner: The under side of a rotatable shaft 212, (Fig. 15), which extends between the side frames, is faced or flattened, and to this area is secured a transverse plate 214 provided with tongues 216, which, in the normal position of the machine underlie the projections 208, on the latch levers 202. Secured to the left-hand end of the shaft 212, inside the frame 66, is an arm 218 (Figs. 15 and 15a) provided at its end with a roller 220, which, in the normal position of the machine, rests in a recess formed in the periphery of a cam 222 secured to the cam shaft 172. The arm 218 is pressed, as shown in Fig. 15, by a spring 223 connected to said arm and to a lower arm 219 of like construction. When the cam shaft 172 rotates, the tongues 216 raise the latch levers 202 to disengage the lugs 204 from the notches 206 and the racks 40 are free to be moved forward.

After the last cam 170 (Fig. 13) has rotated to the position to permit its horizontal slide 167 to move forward, and carry "one" to the last accumulating wheel, means are provided to release the accumulator 76 from the actuating means, and to restore the carrying mechanism. As heretofore described, the accumulators 76 are locked in the depressions 96 and 98 (Fig. 9) by lugs 120, 124 on the latches 114 and 116 engaging the recesses 122 and 126, of the accumulator engaging and disengaging arms 100 and 102. When so engaged the lower ends of the latches 114 and 116 swing forward and the extreme lower end of the latch 116 (Fig. 12) moves into the path of travel of a block 224, (Fig. 12), secured to a horizontal releasing slide 225, similar to and mounted in the same manner as the horizontal carrying slides 167. The releasing slide 225 is forced rearward by a cam 226 secured to the cam shaft 172 and the block 224 striking the extension 130 of the latch 116, disengages the lugs 120 and 124 from the arms 100 and 102, whereupon, as will be hereinafter described, a spring 288 (Fig. 1) attached to an arm 290 fast on the shaft 104 elevates the arms 100 and 102 to disengage the accumulator 76 from the actuating means.

Referring particularly to Fig. 14, the carrying pawls 152 are mounted on and separated apart from one another across the carrying resetting shaft 158 to co-act with the horizontal slides 167 to effect the carrying of tens. The slides 167 (Fig. 13) are almost immediately moved rearward upon entering the low portions of their co-acting cams 170 by the rotation of the cam shaft 172. However, the carrying pawls 152, the trip levers 142, the catches 174, the upper racks 40 and the auxiliary racks 42 must be reset, in case a carry has occurred. On each carrying pawl 152, at the pivot end 154, is formed a finger 228 and to the shaft 158 are secured arms 230, (Fig. 14) which carry at their lower ends a universal resetting rod 232 lying in front of and extending across said fingers 228. The arms 230 are provided with extensions 234, which carry at their forward ends a rod 236 that lies above and extends across the rear ends 182 of the catches 174. A horizontal slide 233, (Fig. 16), similar to and mounted in the same manner as are the horizontal slides 167, is forced against the resetting rod 232 by a cam 238 secured to the cam shaft 172. The resetting rod 232 striking the fingers 228, rocks the carrying pawls 152 on their pivots, permitting the trip levers 142 to assume their normal positions and when the slide 233 moves away from the resetting rod 232, the lugs 150, on the carrying pawls 152, will contact the lower ends of the extensions 148 due to the tension of springs 160. This same action forces the rod 236 to swing the catches 174, disengaging the lugs 176 from the notches 178, of the auxiliary racks 42, and the springs 198 (Fig. 5) of the coupling mechanism, will move the racks 40 and 42 rearward to their normal positions. The ends of the arms 231 (Fig. 14) of the lower actuator are bifurcated to embrace the rod 232 and avoid binding of the parts when the carry resetting rod 232 is forced rearward.

The mechanism of the lower actuator being substantially the same as that described for the upper actuator, it will be understood that the functions of the lower actuator will coincide with the foregoing description, except that the parts are arranged just the reverse and carry odd numbered reference numerals.

In the present machine, when adding an amount to an accumulator, the reversing gear-wheels 44 and 46 are positioned so that the gear-wheels 44 are meshed with the actuator pinions 52 and the rotation of the accumulating wheels 76 will be clockwise. In subtracting an amount from an accumulator, the reversing gear-wheels 44 and 46 are shifted so that the gear-wheels 46 are meshed with the actuating pinions 52 and the rotation of the accumulating wheels 76 will be anti-clockwise. However, in either direction that the accumulating wheels rotate, the two-point cams 80 move in the path of the noses 146 (Fig. 13) of the trip levers 142, and will depress said levers if the wheels pass from "9" to "0", or from "0" to "9". From the foregoing description it will be understood that the functions of the machine will be the same whether adding or subtracting; the accumulating, the carrying of tens, or the borrowing of tens, depends upon the position of the shifting or reversing gear-wheels 44 and 46.

The means for effecting the rotation of the cam shaft 172 will now be described. Referring to Figs. 2 and 17, on the left-hand end of the cam shaft 172 is secured an arm 239 to which is pivoted a dog 240, which, in the normal position of the machine, engages a recess in a disk 241 loosely mounted on said shaft. A gear-wheel 242 secured to the disk 241 meshes with a drive rack 243 mounted on posts 244 projecting from the side frame 67. The drive rack has a reciprocatory movement and, being meshed with the gear-wheel 242, rotates the gear-wheel and disk 241 clockwise when the rack moves forward, without rotating the cam shaft 172.

Secured to the left-hand end of the main drive shaft 01 is an arm 245 (Fig. 17b), and loosely mounted on the end of said drive shaft, alongside the arm 245, (Figs. 17a and 17b), is a bell crank 246, one arm of which is provided on its front edge with a lip 247 that extends laterally over the arm 245. The bell crank 246 is connected to the drive rack 243 by a link 248 and when the drive shaft 01 rotates, the arm 245 swings forward, carrying with it the bell crank 246 and the drive rack 243. As the drive rack 243 moves forward the gear-wheel 242 and the disk 241 rotate about the shaft 172, the recess in the disk 241 moving away from the detent 240. During the time the drive rack 243 moves forward the disk 241 makes a complete revolution and the dog 240 again engages the recess in the disk. A spring connected to the dog and to the arm 239 tends to keep the dog in engagement with the surface of the disk 241. The bell crank 246 and the drive rack 243 do not move rearward when the arm 245 swings back to its normal position. It will be recalled that during the time the drive shaft 01 rotates back to its normal position, the accumulating and the tripping of the carrying mechanism takes place and if the cam shaft 172 rotated at this time the carrying would be ineffective.

The arm 249 of the bell crank 246 has pivoted on the end thereof a depending detainer 250 (Fig. 2) that passes through a hole in the base B45 and at its end is provided with a roller 251. A spring 252 is connected to the upper end of the detainer 250 and to the bell crank 246 so that when the bell crank 246 is in its forward position, the spring moves the lower end of the detainer 250 rearward over a block 253, (Fig. 2), secured to the lower side of base B45 and in this manner locks the bell crank 246 in its forward position. Also connected to the arm 249 is an inverted T-shaped bar 254, to the cross-piece of which are attached springs 255 and a piston-rod 256. The piston-rod is part of a dash pot 257 pivotally mounted on a cross-bar 258 secured to two hangers 259 depending from the base B45. The springs 255 are connected to the cross-bar 258 and will move the bell crank 246 and the rack 243 rearward when the detainer 250 is released from the block 253. A lug 260 on the top of the detainer 250 moves in the path of travel of the arm 245, fast on the drive shaft 0' when the bell crank 246 is rocked forward and locked, and when the arm 245 swings rearward, it strikes the lug 260 and releases the detainer 250 from the block 253. This action takes place near the end of the movement of the arm 245 and after the slides R50 and the racks connected thereto have restored to their normal positions, and at which time the carrying takes place. When the detainer 250 is released from the block 253 the bell crank 246 is forced rearward by the influence of the springs 255, the force of the latter and consequently the movement of bell crank 246, being controlled by the dash-pot 257. When the cam shaft rack 243 rotates the gear-wheel 242 and the disk 241, on the return stroke of the main driving shaft the cam shaft 172 will make a complete revolution.

7. Alignment of the upper group of accumulators

Illustrated particularly in Figs. 1, 3, 11, 16 and 18.

As heretofore described, the upper reel shaft 64 is connected to the paper-carriage, to enable the carriage to positively rotate the accumulator reel. The paper carriage is moved to the left by a spring as is usual in typewriting-machines, and when so moved, the upper reel rotates in the direction of the arrow, Fig. 3. To the right-hand end of the upper shaft 64, outside the frame 66, is secured a circular escapement disk 261 (Fig. 18) to which is secured a sprocket-like ring 262 having as many teeth 263 as there are positions of the upper reel. These teeth move into the path of a roller 264 mounted on a detent 265, pivoted at 266 to the side frame 66. A spring 267 tends to elevate the front end of the detent 265 so that the teeth 263 will strike the roller 264, and the sprocket-like ring 262 is so arranged on the circular disk 261 that when one of the abrupt faces of the teeth 263 abuts against the roller 264 an accumulator is aligned above the depressions 96 and 98, (Fig. 11) of the abutment rings 82, 84; that is to say, an accumulator is aligned with the actuator, or the actuating pinions 52. When an amount has been computed, or it is desired to pass on to align the next accumulator with the pinions 52, the roller 264 is released from the abrupt face of the escapment 263 by the following means:

An arm 268 secured to the end of the carry resetting shaft 158, (Fig. 16), is connected to the detent 265 by a link 269, and, as heretofore described, the carry resetting shaft 158 is slightly rotated when the horizontal carry resetting slide 233 is forced rearward by the resetting cam 238. The latter is so formed that this action is momentary; the detent 265 is sufficiently depressed to release the engaged tooth 263, and is immediately elevated by its spring 267 to stop the rotation of the reel after it has advanced one step due to the tabular space of the carriage by engaging the next tooth. The lower end of the link 269 is provided with a slot so that the detent 265 can be manually depressed, and also to permit the resetting bail arms 230 to swing forward when the resetting cam 238 moves away from the slide 233. Another purpose of the slot is to permit the detent 265 to swing when the upper reel is rotated in the reverse direction as the paper carriage is returned to the beginning of a line, the teeth 263 ratcheting over the roller 264 during such carriage return.

8. Automatic engagement of the accumulators with the actuators

Illustrated particularly in Figs. 1 and 19.

As heretofore noted, the roller 028, on the end of the driving arm 051, co-acting with the irregular cam slot 501 in the arm 062, swings the slotted arm upward or counter-clockwise when the drive shaft 01 rotates. On the end of the shaft R1, which is rocked by the slotted arm 062, is pivoted a connector 270 to which in turn is pivoted a link 271, the rear end of which is connected to the vertical arm of a three-armed reversing lever 272 rotatable on a post 273 projecting from the side frame 66. To the forward extending arm of the reversing lever 272 is pivoted the end of a link 274, rotatable about a post 276 projecting from the side frame 66, and to the rearward extending arm of the reversing lever 272 is pivoted one end of a link 275 rotatable about a post 277, which also projects from the side frame 66. An accumulator engaging coupling 280 is pivotally connected at 278 to the link 274 and in like manner, an accumulator engaging coupling 281 is pivoted at 279 to the link 275. The hooked end 282 of the coupling 280 overlies a block 284 mounted on an arm 286 of a bell crank secured to the accumulator engaging and disengaging shaft 104 for the upper group of accumulators and the coupling 281 has a hooked end 283 that underlies a block 285 mounted on an arm 287 of a bell crank secured to the accumulator engaging shaft 105 for the lower group of accumulators.

When roller 028 on the drive arm 051 swings upward, it strikes the connector 270 and rocks the latter to draw the link 271 forward which, in turn, rotates the three-armed reversing lever 272. This action of the reversing link rocks the links 274 and 275 towards each other and, as the link 274 swings downward, the hooked end 282 of the coupling 280 engages the block 284 and the arm 286 is rocked clockwise, rotating the accumulator engaging and disengaging shaft 104 and its accumulator shifting arms 100, 102 (Fig. 11) clockwise to engage that accumulator which is aligned with the notches 96, 98 with the actuator pinions 52. The shaft 105 is rotated in a like manner except that the link 275 swings upward to elevate the arm 287 and engage the positioned accumulator 77 with the actuating pinions 53.

As heretofore described, the accumulator shifting arms 100 and 102 are secured to the shaft 104 and the arms 101 and 103 are secured to the shaft 105. The said arms it will be recalled, engage the accumulators with the actuating means. A spring 288 connected to the remaining arm 290 of the bell crank 286 and to a stud in the side frame 66, tends to restore the shaft 104 and elevate the arms 100, 102 secured to the shaft 104, and a spring 289 tends to depress the arms 101 and 103 secured to the shaft 105 to disengage the lower accumulator 77 from its pinions 53.

The couplings 280 and 281 are pulled forward by suitable springs 292 and 293 so that the upper end of the coupling 280, and the lower end of the coupling 281, rest against their respective blocks 284 and 285, their hooked ends ready to grip the blocks. Normally the reversing lever 272 is held retracted by a spring 294 (Fig. 1), so that there is a space between the hook ends and the blocks, said spring being connected to the vertical arm of the three-armed lever 272 and a stud in the side frame.

9. Computing controls of the upper actuator

Illustrated particularly in Figs. 1, 20, 21 and 22.

In the present machine as the accumulators of the upper group align with the actuating means, the paper-carriage assumes a definite position with respect to the type-sectors and the amounts printed across the work-sheet are computed in said accumulators; that is to say, the amounts printed in the first columnar position are either added to, or subtracted from, the "number one" accumulator, the amounts printed in the second columnar position are either added to, or subtracted from, the "number two" accumulator, and so on.

It will be understood, however, that this is merely by way of illustration, to disclose the use of the invention in connection with one of the many systems to which it may be applied.

As a matter of fact, the spring-driven paper carriage in its step-by-step tabulation from right to left to position different columns of the work sheet at the operating line under control of an escapement mechanism such as that disclosed in Fig. 16, operates through the train of mechanism such as that shown in Fig. 3 for example, to positively turn the upper reel shaft 64 step-by-step and couple the corresponding accumulators 76 with the shifting arms 100, 102, common to all the accumulators, for engagement with, and disengagement from, the actuating pinions 52.

In this embodiment illustrative of one form of the invention, the paper carriage C45 when at the beginning of a line or in the first tabulating position, is located at what may be called the first accumulator in the shifting arms 100, 102, and upon operating the machine the shifting arms are rocked as previously described, to engage the first accumulator with the actuating pinions 52 with which it remains engaged until the amount set up on the keyboard has been registered thereon, whereupon the accumulator is disengaged from the pinions 52 and the paper carriage released to position another column of the work sheet at the printing line and simultaneously turn the upper accumulator reel to position another accumulator in effective position relatively to shifting arms 100, 102 in readiness for the next operation of the machine.

However, these results may be obtained by agencies commonly used in machines of this type from which similar improvements can be obtained.

It is obvious that a selection of any accumulator for operation may be made by simply locking the paper carriage so that the particular column on the work sheet supported in the carriage is positioned at the printing line.

Nor is the invention confined to the addition of items on the several accumulators, and the following will explain how items may be added, subtracted or non-computed on the various accumulators of the upper and lower groups according to a pre-determined order, provision being made to vary such order at will if occasion arises.

The means to engage an accumulator of either group with the actuating means and the gearings actuating to rotate the accumulating wheels have been heretofore described. The means to automatically shift the gear-wheels 44 and 46 of the upper actuator, or to control the mechanism to non-compute, will now be described. Mounted on the shaft 64, preferably outside of side frame 66, and rotating therewith, is a disk 296, (Fig. 20), the periphery of which is provided with cams 298, and a cam 300, the effective profiles or extents of certain of the cams for example, being indicated by dot-and-dash lines. It will be understood that any desired number of cams 298 and 300 may be provided, and if desired, the entire number provided may be similar to cams 298. The portion of the cam surface of greater radius (hereafter referred to as "high point") of a cam 298 controls "adding to" and the "low point", or portion of the cam surface of less radius, controls "subtracting from" the accumulators. The contour of a cam 300 controls the mechanism to "non-compute", even though an accumulator is aligned with the actuating means.

The control disk 296 may be divided into as many cam-surfaces as there are accumulators in the upper group, or columnar printing positions across the work-sheet, and, as each accumulator aligns with the actuating means, the high point of a cam 298 aligns with the means to shift the reversing gear-wheels 44 and 46 to add, or a cam 300 aligns with the means which operate to prevent a computation.

The purpose of the low point of a cam 298 is to cause the reverse operation to that of the normal arrangement; in other words, the high point of a cam 298 causes the mechanism to add, which is the normal operation, and the low point causes the mechanism to subtract. As hereinafter more fully described, the disk 296 is given a supplementary movement, independent of the rotation of the shaft 64, when, as in case of an error or for some other reason, it is desired to subtract.

A lever 302 mounted on a rod 295, projecting from the side frame 66, is provided with a roller 304, which roller is in constant contacting with the cam-surfaces of the disk 296. A slide 306, provided with a slot 308 and an extension 310, is pivoted to the lever 302 and the rear end of said slide is mounted on a stud 312 projecting inwardly from the bell crank arm 286. A spring 314 connected to the lever 302 and to a rod 399 in the side frame 66 tends to move the lower end of the lever and the slide 306 rearward. However, when the high point of a cam 298 is aligned with the roller 304, the slide 306 is forced forward and the extension 310 will overlie one arm of a bell-crank 316, (Figs. 21 and 22), pivoted to a flattened face on the front of the pinion shaft 54. The arm 318 of the bell-crank 316 engages a notch 320 on the front side of the slidable reversing shaft 50, upon which the reversing gear-wheels 44 and 46 are mounted. The gear-wheels are mounted on the slidable shaft 50 between two collars pinned to said shaft, so that the shaft and the gear-wheels shift together. A space between the collars and the inside of the machine frames 66, 67 permits the shifting of the shaft and the gear-wheels. If, when in the position shown in Fig. 1, the bell crank arm 286 is depressed, it will carry with it the rear end of the slide 306 and the extension 310 will strike the bell-crank 316 and swing the arm 318 towards the side frame 66. This action will shift the shaft 50 and the reversing gear-wheels 44 and 46, moving gear-wheels 44 into mesh with the pinions 52. If the low point of a cam 298 is aligned with the roller 304, the lever 302 and the slide 306 will move rearward and the extension 310 will overlie a link 322, (Figs. 21 and 22), pivoted to a flattened face on the rear side of the shaft 54. The link 322 is connected to a bell-crank 324 by a link 326 and said bell-crank is pivoted to the rear side of a boss 301 projecting from the side frame. The arm 328 of the bell-crank 324 engages a notch on the rear side of the shaft 50. With the extension 310 in the above position, a depression of the bell crank arm 286 will cause the extension to strike the link 322, and by the connections shown, force the arm 328, of the bell-crank 324, away from the side frame 66 and axially shift the shaft 50 and its reversing gear-wheels 44 and 46 to bring the gear-wheels 46 into mesh with the pinions 52.

It does not matter in which way the pinions 52 rotate when the slides R50 and the racks move rearward. It is pointed out that the accumulating wheels 76 are not engaged with the pinions 52 until after the slides and the racks have moved rearward, in other words, when the slides and the racks have moved rearward according to the amount setup on the key-board, the reversing gear-wheels are shifted at the same time that the accumulator is lowered to engage with the actuating means.

When it is desired to print amounts in a certain position, or positions, of the work-sheet to designate non-computed items, the control disk 296 is provided with one or more cams 300 to align with the roller 304 and the slide 306 may be provided with a hooked wing 330 that embraces the coupling 280. The surface of the cam 300 permits the lever 302 and the slide 306 to move rearward a greater distance than the low point of a cam 298, and as it does, that part of the hooked wing 330 that projects laterally under the bell crank arm 286 strikes the coupling 280 and moves the hooked end 282 thereof rearward beyond the block 284 so that when the coupling 280 is depressed it will not engage the block.

The disk 296 is illustrated as being provided with cams 300 for the purpose of illustrating the flexibility of the machine, rather than the commercial use of same. In commercial use the amounts printed across the work-sheet are added to the accumulators to get the vertical totals, and if, in certain positions of the work-sheet, the amounts need not be added, that is to say, the amounts are non-computed, the reel need not carry accumulators at these non-computing positions. However, a machine constructed to print, and to compute in all of the plurality of positions may be used in another class of work that does not require all the positions to be computed. In this case it is desirable, but not necessary, to use the cams 300 in the non-computing positions.

Referring to Fig. 1, it will be observed that the disk 296 is equally divided into ten cams 298. As the reel rotates and the different accumulators align with the actuating means, the high points of the cams 298 automatically align with the roller 304 on the lever 302 and the slide 306 assumes the position to shift the reversing gear-wheels 44 and 46 for adding. With this particular disk mounted on the shaft 64, and with ten printing positions across the work-sheet, each position will be computed so that the amounts printed in the first columnar position will be added to the "number one" accumulator, the amounts printed in the second columnar position will be added to the "number two" accumulator, and so on.

As will be hereinafter more fully described, the control disk 296 is removable from the shaft 64 so that some other control disk 296 may be used. If, for instance, the control disk 296, shown in Fig. 20, is mounted on the reel shaft 64, one of the printing positions will be non-computed because this control disk has a cam 300, the surface of which, when it aligns with the roller 304, permits the lever 302 and the slide 306 to move rearward and the hooked wing 330, on the slide, to swing the hooked end 282 of the coupling 280 clear of the block 284.

The unusual flexibility of the machine is further shown by the fact that if it is desired to subtract automatically, the reverse operation to add, it is readily understood that the positions of the high and low points of the control disk 296, as shown in Fig. 1, may be reversed. This particular flexibility of the machine will be more fully described in explaining the functions of the lower actuator.

While the drawings illustrate the preferred form of the control disks it is to be expressly understood that the invention is not limited to the construction illustrated since these disks may be formed in a variety of ways.

*10. Computing controls of the lower actuator*

Illustrated particularly in Figs. 1, 21, 22 and 23.

As heretofore described, any one of the accumulators 77 of the lower group may be aligned with the lower actuator pinions 53, or the reversing gears 45, 47 may be shifted as desired, during the time the paper-carriage moves from right to left, and the amounts printed across the work-sheet may be "added", "subtracted", or "non-computed".

The parts of the lower actuator constituting the mechanism to automatically shift the reversing gear-wheels 45 and 47, or to control the mechanism to non-compute, are similar to those just described for the upper actuator. Mounted on the upper reel shaft 64, (Fig. 23), and rotating therewith, is a disk 297, the periphery of which is formed into cam-surfaces. The control disk may be divided into as many cam-surfaces as there are columnar printing positions across the work-sheet. As shown, a cam 333 controls the mechanism to "add", a cam 335 controls the mechanism to "subtract" and a cam 337 controls the mechanism to "non-compute", but it will be understood that any suitable arrangement of the cams on the control disk 297 may be made to take care of different forms of work, as when all of the cams are "add" cams.

A lever 303 mounted on the rod 295 is provided with a roller 305, which is in constant contact with the cam-surfaces of the control disk 297 for the lower group of accumulators. A stud in the lower end of the lever 303 is embraced by the upper forked end of a lever 332, the fulcrum of which is a rod 334 projecting from the side frame 66. A slide 307, provided with a slot 309 and an extension 311, is connected to the lower end 336 of the lever 332 and the rear end of said slide is mounted on a stud 313 projecting inwardly from the arm 287. Under the influence of a spring 315 the lever 303 moves rearward and the slide 307 moves forward.

The roller 305 rests against a cam 335, and as shown in Fig. 1, the extension 311 underlies a link 323, (see Fig. 22), connected to one arm of a bell-crank 325 by a link 327. The link 323 is pivoted to a flattened face on the front side of the lower pinion shaft 55 and the bell-crank 325 is pivoted to the front side of the boss 301, and the arm 329 of the bell-crank 325 engages a notch 321 on the lower reversing shaft 51. If, in this position, the arm 287 is moved upward, the extension 311 will strike the link 323 causing the bell-crank 325 to shift the reversing shaft 51 and the reversing gear-wheels 45 and 47 so that the gear-wheels 47 mesh with the actuating pinions 53. It is pointed out that when so geared, subtraction will result on the lower accumulator selected for operation.

If, for instance, the shaft 64 and the disk 297 for the lower group of accumulators rotated one step, in the direction of the arrow, Fig. 23, so that the next cam, which is an adding cam 333, aligns with the roller 305, the slide 307 will move rearward and the extension 311 will assume the position underlying one arm of a bell-crank 317 pivoted to a flattened face on the rear side of the pinion shaft 55, (Fig. 22). The arm 319 of the bell-crank 317 engages a notch on the rear side of the reversing shaft 51, and if, in this position, the arm 287 is moved upward the extension 311 will strike the bell-crank 317 and shift the slidable shaft 51 and the reversing gear-wheels 45 and 47 so that the gear wheels 45 mesh with the pinions 53. It is pointed out that when so geared, addition will result on the lower accumulator selected for operation.

If the shaft 64 and the disk 297 are rotated so the cam 337, which is a non-computing cam, (Fig. 23), aligns with the roller 305, the slide 307 will be forced rearward and a hooked wing 331 formed on the slide will swing the hooked end 283 of the coupling 281 clear of the block 285 on the arm 287, and said arm will not be moved upward when the machine operates. It is pointed out that this action results in non-computing.

The adding cam 333 is provided with a subtracting surface, and, the subtracting cam 335 is provided with an adding surface, and, as will be hereinafter more fully described, the control disk 297 is given a supplementary movement when it is desired to reverse the normal arrangement of the controlling mechanism of the machine.

From the foregoing description it will be understood that if the amounts printed in the first columnar position of the work-sheet are to be non-computed items, the control disk 297, at this point, is provided with a cam 337, if the amounts printed in the second columnar position are to be added, the control disk 297, at this point, is provided with a cam 333, and if the amounts printed in the third columnar position are to be subtracted, the control disk 297, at this point is provided with a cam 335.

11. *United controls*

Illustrated particularly in Figs. 1, 18, 23 and 24.

It is noted that the disk 296 controls the mechanism of the upper actuator, and that the accumulators 76 coacting therewith, will vertically compute the amounts printed across the work-sheet. It is also pointed out that the disk 297 controls the mechanism of the lower actuator, and that the accumulators 77 co-acting therewith, will horizontally compute the amounts printed across the work-sheet. In each case the functions are independent of the other; that is to say, a machine may be constructed with only the upper actuator and the accumulators co-acting therewith, or a machine may be constructed with only the lower actuator and the accumulators co-acting therewith.

However, when it is desired to print amounts across the work-sheet and to vertically and horizontally compute said amounts the disks 296 and 297 are joined together and mounted on the shaft 64 so that the paired cam surfaces on the respective control disks simultaneously actuate means for producing the desired results. And such results may differ on the respective upper and lower accumulators selected for operation, the amount set up on the keyboard being subtracted from the total registered on one accumulator and simultaneously added on the other accumulator, or simultaneously added or subtracted on both accumulators. If, for instance, an amount printed in the first columnar position of the work-sheet is to be added to the "number one" accumulator of the upper group, and, at the same time, is to be added to the aligned accumulator of the lower group, both control disks, at these points, are provided with "adding" cam-surfaces, and the control disks must rotate as a unit so that these two cam-surfaces will act together whenever the paper-carriage is in the first columnar position.

It will be readily understood that many different combinations may be arranged by the various cam-surfaces acting together. Some of these combinations are as follows:—An amount printed in the first columnar position may be added to the "number one" accumulator of the upper group if an adding cam 298 is formed on the disk 296 at the point said disk aligns with the roller 304, and may be added at the same time to the aligned accumulator of the lower group if an adding cam 333 is formed on the disk 297 at the point at which said disk aligns with the roller 305; or, the amount may be added only to the aligned accumulator of the lower group by a non-computing cam 300, formed on the disk 296, instead of the adding cam 298; or, the amount may be added only to "number one" accumulator of the upper group by providing a non-computing cam 337, on the disk 297, instead of the adding cam 333; or, the amount may be subtracted from the aligned accumulator of the lower group at the same time it is added to "number one" accumulator of the upper group by providing a subtracting cam 335, on the disk 297, instead of the adding cam 333; or, the amount may be subtracted from the aligned accumulator of the lower group at the same time a non-computing cam 300 on the control disk 296 controls the upper mechanism. These results are equally applicable to the other printing positions, except that the different accumulators of the upper group are automatically aligned with the upper actuator, and the accumulators of the lower group are manually moved to align with the lower actuator.

The control disks 296 and 297 are separated by a collar 338, (Figs. 24 and 30a), and are secured to said collar by screws, so that the disks will move together. The disk 297 is provided with a slot 339, (Fig. 23), which accommodates a stud 340, (Figs. 18 and 18a), on the circular escapement disk 261. After the disks are mounted on the shaft 64, with the stud 340 in the slot 339, an arm 341 (Fig. 1) is secured to the end of the shaft 64 and a spring 342, connected to said arm and to a screw 343 in the disk 296, tends to rotate the disks about the shaft 64 until the stud rests in the upper part of the slot, as shown in Fig. 23. In this position the control disks 296 and 297 will rotate with the shaft 64 and the different cam-surfaces of both disks will automatically control the mechanism as described.

12. Reverse mechanism

Illustrated particularly in Figs. 1, 2, 18 and 25.

It is pointed out that the peripheries of the control disks 296 and 297 are formed of successive cam-surfaces, each of which has an adding and a subtracting area. One object of this arrangement is to provide means to readily change the normal operation o. the machine. It is noted that the control disks are loosely mounted on the upper reel shaft 64 and are rotated with said shaft by the arm 341 and stud 340 engaging the slot 339 of the disk 297. When the shaft 64 is locked against rotation, in the direction of the arrow (Fig. 18), by the contact of the abrupt face of any of the teeth 263 with the detent roller 264, the control disks are free to be rotated through an arc equal to the length of the slot 339. This movement is sufficient to change the cam areas presented to the respective levers 302 and 303, and is done in the following manner.

Referring to Figs. 2 and 25, a key lever 344 mounted on a pivot 345 is provided with a key stem 346, which extends through an aperture of the keyboard plate, and a stud 347 on the rear end of the key lever 344 engages a bifurcated arm 348 secured to a shaft 349 extending across the machine, and secured to the right-hand end thereof is an arm 350, connected by a link 352 to a lever 351, which extends upward from its fulcrum 334 so that when the key stem 346 is depressed, the upper end of the lever 351 will swing rearward. A pawl 353 is pivoted to the upper end of the lever 351, the tail 357 of the pawl contacting a stud 399 on the frame of the machine, and as the lever swings rearward, the pawl moves upwardly, under the influence of a spring 359, which enters between the control disks 296 and 297. Secured between the disks 296 and 297 is a ratchet wheel 354 provided with teeth 355 and as the pawl strikes the tooth 355 in the path of its travel it forces the control disks to rotate until the lower end of the slot 339 contacts the stud 340. In this position of the control disks the levers 302 and 303, (Fig. 1), and the slides 306 and 307 assume the reverse arrangement to the normal operation of the machine, that is to say, assuming that the control disks 296 and 297 are so arranged relatively to each other that their respective peripheral cam areas at that particular time are adapted to effect simultaneous adding on the selected accumulators of the upper and lower groups. The adjustment of the control disks relatively to their rollers 304, 305 on their respective levers 302, 303, by the manual depression of the key 346, will operate to position the subtracting areas of the said peripheral cam faces opposite the rolls 304, 305 in place of the adding areas of such cam faces.

Furthermore, it is within the purview of this invention to so form the successive peripheral cam faces on the respective control disks, that one area of each of such cam faces shall control addition and the remaining area shall control the mechanism for non-computing.

Again, if the control disks 296, 297 occupy positions wherein subtracting areas of the particular cam faces presented to the rolls 304, 305 are effective, and it is desired to add on the next operation, it will only be necessary for the operator to depress the special key 346 to adjust the control disks in clockwise direction to bring adding areas of the peripheral cam faces to the effective position relatively to the rolls 304, 305. Of course, this function pre-supposes that the adding and subtracting areas of the successive cam faces 298 alternate as shown in Fig. 1, but it is obvious that the construction lends itself to any variety of permutations and changes which the character or exigencies of the work may require.

It will be appreciated that in case of error, or for some other reason, it is desired to change the normal operation of the machine, the above mechanism is very important.

When the stem 346 is released, the parts move back to their normal positions under the influence of a spring 356 connected to the lever 351 and to a stud in the side frame. When the lever 351 swings forward, the tail 357 of the pawl 353 by its contact with the rod 399 lowers the nose of the pawl clear of the control disks and the spring 342, (Fig. 1), will rotate the control disks to resume their normal positions relatively to the limiting stud 340.

13. Paper-carriage tabulation

Illustrated particularly in Figs. 1, 2, 16, 18, 24, 26, 27, 29 and 31.

The number of tabular stops of which the paper-carriage may be capable, is determined by the number of columnar or printing positions on the work sheet, and when it is desired to move from one such position to the next, appropriate means are provided to disengage the escapement of the paper-carriage. In the present machine there are two methods of tabulating, viz., manual and automatic, and the manual means will be first described.

To the side frame B46, (Fig. 1), at 0122, is pivoted a tabulating lever F66, the forward end of which extends through a slotted plate at the front of the machine and is provided at its front end with a keytop. The extreme rear end 358 of the lever F66 underlies a transverse lever F160, (Figs. 1 and 26), which latter passes through a hole in the side frame B46 and is pivoted at F22 to a transverse frame extending between and secured to the side frames of the machine. The other end of the lever F160 engages a stud F13 on a vertically mounted bar F70, which is supported by the transverse frame and the lower end of said bar is bifurcated and embraces the front end of a bell-crank F51 pivoted on a boss of the transverse frame. The other end of the bell-crank F51 is connected to a link F52 extending to the rear of the machine and serving the purpose of disengaging the usual escapement of the paper-carriage—all of which is done in a manner usual in typewriting-machines.

When the tabulating lever F66 is depressed the escapement is disengaged and the paper-carriage C45 will move from right to left until the abrupt face of one of the teeth 263, (Fig. 18), on the escapement ratchet wheel 261, strikes the roller 264 on the detent 265. Means are provided to hold the transverse lever F160 in its abnormal position, i. e., to keep the usual typewriter escapement disengaged, as follows:

A locking arm 360 mounted on a shaft 361, (Figs. 1 and 16), is provided near its upper end with a notch and is connected by a link 362 to a lever 363, which depends from the supporting rod 295. The lever 363 and its locking arm 360 are drawn rearward under the influence of a spring 364 to engage the notch in the locking arm 360 with the transverse lever F160 when said lever is elevated.

Means to automatically disengage the usual escapement (not shown) of the paper-carriage will now be described. A finger 365 pivoted on the arm 060, (Fig. 1), which arm is secured to the shaft P1, is also connected to said arm by a spring 366 so that the finger 365 and the arm 060 will move together. The arm 060 is connected to the driving arm 051 by a link 061 and when the arm 051 swings upwardly the fore-end of the finger 365 is forced against the lower side of the transverse lever F160, elevating the latter to permit its engagement with the notch of the locking arm 360. It will be readily understood that as long as the notch of the locking arm 360 holds the transverse lever F160 in its abnormal position, the usual line space escapement of the paper-carriage will remain ineffective and the paper-carriage will tabulate from one printing position to the next under control of the escapement ratchet teeth 263 and detent 265.

To manually disengage the locking arm 360 from the transverse lever F160, when it is desired to enable the usual typewriter escapement to control the feed of the paper-carriage, the locking arm 360 is provided with an extension 367, (Figs. 1 and 16), which passes through an aperture in the keyboard plate so that the top of said extension can be finger-pressed and the locking arm moved forward to release the lever F160.

To automatically disengage the locking arm 360 from the transverse lever F160, a disk 368, (Fig. 16), similar to the computing control disks 296 and 297, is mounted on the shaft 64. The periphery of said release disk 368 is formed into one or more cam-surfaces to co-act with a roller 369 on the lever 363. As shown in Fig. 16, the disk has a depression 374 aligned with the roller 369. When the upper accumulator reel rotates, the unmutilated periphery of the disk 368 strikes the roller 369 and forces the lower end of the lever 363 forward, and by the connections described, moves the locking arm 360 forward to disengage the latter from the transverse lever F160. So long as the unmutilated periphery of the release disk 368 contacts the roller 369, the locking arm 369 will be ineffective to hold the transverse lever F160 in its abnormal position, and the paper-carriage will move only as the usual typewriter escapement permits, unless the tabulating lever F66 is depressed. However, if a tooth 263, on the ratchet wheel 261, abuts against the detent roller 264, the reel cannot rotate and therefore it locks the paper-carriage against movement from right to left.

When it is desired to move the paper-carriage, step by step, under control of the usual typewriter escapement and to write on the work-sheet with the typewriter mechanism shown in Fig. 4, the detent roller 264, on the detent 265, is lowered beyond the path of travel of the teeth 263, by the following means: Depending from the rod 295, alongside the lever 363, (Fig. 16), is a lever 370 normally urged forwardly by a spring 371. The lower end of the lever 370 abuts against a stud 372 on the forward end of the detent 265 and will move over the stud when the detent 265 is depressed and in this way lock the detent 265 in its lowermost position; permitting the teeth 263 to pass over the detent roller 264.

A stud 373 projecting inwardly from the lever 363 limits the forward movement of the lever 370 and also disconnects the lever 370 from the stud 372 when the roller 369 aligns with a depression 374 of the release disk 368. Furthermore, during the time the roller 369 aligns with a depression 374, the stud 373 prevents the lever 370 from moving over the stud 372 when the detent 265 is lowered. If the work sheet introduced into the paper-carriage is divided into a plurality of columnar printing positions, for number printing only, the disk 368 is not necessary, however, the disk in which event, may be reduced in size to the radius of the depression 374 and mounted on the shaft 64 for other purposes, as for facilitating assembly.

If the work sheet in the paper-carriage is divided into columnar printing positions, for number printing and it is also desired to write thereon with the typewriter mechanism, the release disk 368 is formed with a depression 374, at the point, or points, corresponding to the position or positions at which the number printing shall occur. During this time it is understood that the usual typewriter escapement is disengaged from the paper carriage and is inoperative by reason of the fact that the upright face of a tooth 263 abuts the detent roller 264.

Corresponding to the position of writing with the typewriter mechanism, the periphery of the release disk 368 is unmutilated and the means to hold the typewriter escapement disengaged is ineffective. But if a tooth 263 abuts the detent roller 264 at this time, preventing the upper reel and its shaft 64 from rotating, and the paper-carriage from moving from right to left when the typewriter keys T68 are actuated, one of three operations may be resorted to to lower and lock the escapement 265 and its roller out of the path of the teeth 263. The escapement detent 265 is provided at its rear end with an extension 375, (Figs. 1 and 16), which may be manually raised to lower and lock said lever; or the machine may be operated and said detent 265 lowered and locked as heretofore described, or the paper-carriage may be manually moved to the right towards the beginning of a line until a tooth 263 passes over the detent roller 264, from the rear side, thus lowering and locking the detent 265 in idle position.

If, for instance, the first three columnar positions of the work-sheet require number printing, followed by descriptive matter, printed by the typewriter mechanism, the disk 368 at the points, corresponding to the first, second and third columnar positions will be formed of one continuous depression 374 so that after the machine is operated to print in the first columnar position and the escapement (Fig. 16) disengaged, the paper-carriage will automatically tabulate to the second and third columnar positions as the amounts are printed. When the third amount is printed and the upper accumulator reel rotates, it is almost immediately stopped by the connections described when the unmutilated periphery of the release disk 368 strikes the roller 369. Depression of the tabulating lever F66 will again disengage the escapement and the paper-carriage will tabulate to the position, on the work-sheet, for descriptive matter. While the unmutilated periphery of the release disk 368 contacts with the roller 369, the locking arm 360 is ineffective to lock the transverse lever F160 in its abnormal position and the tabulating lever F66 can be operated in a manner usual in typewriting-machines.

The release disk 368 is loosely mounted on a sleeve 376, (Fig. 27), to which it is connected by a clip 377, (Fig. 28). The clip 377 is secured to the disk 368 after being inserted into a groove 378 of the sleeve, (Fig. 29). This connection permits the release disk to rotate about the sleeve and prevents disconnection of said disk and sleeve. The control disks 296 and 297, (Fig. 24), being united by the collar 338, are loosely mounted on the projecting end of the sleeve 376 and are rotatably secured on the sleeve by a clip 379, (Fig. 30), inserted into a groove 380 in the sleeve. The release disk 368 is provided with a hole 381 to engage the stud 340, secured to the circular escapement disk 261, and in this manner said release disk 368 rotates with the shaft 64. The stud 340 projects beyond the release disk 368 and engages the slot 339 in the control disk 297, as heretofore described.

The three disks, 296, 297 and 368, being mounted on the sleeve 376, in the manner described, are as a unit, mounted on the upper reel shaft 64. The object of this is to facilitate removal of the disks as a unit when it is desired to change the disks to variously and automatically control the operating conditions of the machine. It also prevents relative disarrangement and disconnection of the disks when not mounted on the reel shaft 64. The control disk 296 for the upper group of accumulators is not provided with a hole 381, as is the release disk 368, and this prevents mounting the disks, as a unit, on the shaft 64 other than in the proper manner.

To prevent misoperation of the machine during the time the upper reel rotates from one position to another, means are provided to lock the operating bar 1 so that it cannot be depressed. On the left-hand end of the upper reel shaft 64 is secured a locking disk 382, (Figs. 2 and 31), provided with projections 383. As the shaft 64 rotates step-by-step these projections contact a roller 384 mounted on a lever 385, which depends from a rod 386 projecting from the side frame 67. The projections 383 are arranged on the locking disk 382 to correspond with the positions of the upper accumulators 76 and when an accumulator is aligned with the actuating pinions 52 a projection 383 aligns with the roller 384. The lever 385 is provided with a stud 387, which engages a shoulder on a link 388 connected at its front end to an arm 389, (Fig. 2) secured to the transverse locking shaft 361 that extends from the left side to the right-hand side of the machine. On the right-hand end of the locking shaft 361 is secured an arm 390, (Fig. 1), the end of which is bifurcated to embrace a stud 391 on one arm of a locking bell-crank 392. The locking bell-crank 392 is pivoted at 393 to the side frame B46 and the remaining arm swings back and forth over a stud 394 on the circular piece 3. In the normal position of the machine, with one of the upper accumulators aligned with the upper actuator pinions 52, a projection 383 on the locking disk 382 forces the lever 385 forward and the stud 387 engaging the link 388 moves the arm 389 forward. This action rotates the locking shaft 361 and the arm 390 swings the locking bell-crank 392 so that the stud 394, on the circular piece 3, can elevate when the operating bar 1 is depressed to enable the machine to operate. If the projection 383 is moved away from the roller 384 the lever 385 will swing rearward under the influence of a spring 395 connected to said lever, and a spring 396 (Fig. 2) connected to the arm 389 tends to rotate the locking shaft 361. The rotation of the shaft 361 swings the bifurcated arm 390 upward and the locking bell-crank 392 rearward. In this position of the locking bell-crank 392, the stud 394 strikes the end 397 of said bell-crank and the circular piece 3 cannot swing on its pivot when an attempt is made to depress the operating bar.

When the parts are in position to operate the machine, means are provided to release the link 388 from the stud 387 on the lever 385, during the time the machine operates, so that the lock will become effective if the reel for some reason does not rotate a full stop to the next position. An arm 398, (Figs. 2 and 31), secured to the end of a collar loosely mounted on a rod 399 projecting from the side frame 67, is provided with a lug 400 that extends laterally under the link 388 and secured to the other end of the collar is an arm 401, which extends downward alongside the cam shaft drive rack 243 (Fig. 17). A stud 402 on the drive rack 243 normally lies in the path of the arm 401 and holds it rearward against the pressure of a spring 403, (Figs. 2 and 31), connected to the arm 398 and a stud 404 in the side frame. When the machine operates, the drive rack 243 moves forward to release the arms 398 and 401 to the action of their respective springs, which rocks the arms 398 and 401 to cause the lug 400 to strike the link 388 with sufficient force to disengage said link from the stud 387, on the lever 385. The spring 396 (Fig. 2), connected to the arm 389, immediately rotates the locking shaft 361, causing the arm 389 and the link 388 to move rearward, and the bifurcated arm 390 and the locking bell-crank 392 to assume positions in readiness to lock the circular piece 3 upon the restoration of the starting key 1. To again engage the link 388 with the stud 387 on the operating lever 385, so the machine can be operated, the upper reel and its shaft 64 must either rotate to the next position automatically, or the paper-carriage must be manually moved to the right, or left, to move the aligned projection 383 away from the roller 384, to permit the lever 385 to swing rearward and engage the stud 387 with the link 388, the link dropping by gravity onto the pin 387, because the drive rack 243 on its return has rocked the arms 401, 398 to their retracted positions.

The purpose of this locking mechanism is as aforesaid—to prevent misoperation of the machine. If the means for effecting this locking of the operating bar 1 is not applied, and for some reason, the reel does not rotate after the machine is operated, serious injury may result to the machine.

Another purpose of this locking mechanism is to prevent the depression of the operating bar 1 during the time that the usual typewriter escapement mechanism, not shown, is operated. It is pointed out that during the time the paper-carriage tabulates, from one columnar number printing position to the next, initiated by the actuation of the operating bar, the typewriter mechanism is held ineffective. It is also important that the operating bar be held ineffective to perform its functions when the typewriter mechanism is being actuated.

14. Number key release

Illustrated particularly in Figs. 2, 3, and 32.

The denominational rows of numeral keys K51 to K59, inclusive, are maintained in their depressed positions by a shutter latch extending lengthwise of the keyboard to engage all nine keys, and there is a similar latch for each row of keys as is usual in this type of machine. These various latches are swung to the left in the machine by the transverse movement of a bar 66K, (Fig. 3), located adjacent the front end of the machine, which bar engages a bell-crank L53, (Figs. 2 and 32), which in turn is operated by a longitudinal sliding bar L51 notched at accommodate one end of the bell-crank.

The numeral keys are released during the time the clutch mechanism completes its rotation, and consequently during the return of the main drive shaft 01; and this is accomplished in the following manner. Secured to the left-hand end of the shaft 01, outside the frame B47, is a suitable plate D55 carrying a roller D30. As the drive shaft 01 turns clockwise in Fig. 2 on its forward stroke, the roller D30 moves to the right, as viewed in Fig. 2, which permits a clutch hook L63 pivoted to the rear end of the sliding bar L51, to engage the roller D30. On the return stroke of the shaft 01 the roller D30, being engaged by the clutch hook L63 draws the sliding bar L51 towards the rear of the machine and operates the bell-crank L53 and the transverse bar 66K to release the numeral keys. The upward extending arm of the clutch L63 is arrested by a stud L35 at a suitable time to release the clutch hook L63 from the roller D30, and permit the sliding bar L51 and its connections to the transverse bar 66K to resume their normal positions under the influence of the shutter latch springs in the usual and well known manner.

15. Manual total and sub-total mechanism

Illustrated particularly in Figs. 1, 2, 3, 32, 33, 34, 35 and 36.

When a total or a sub-total is to be taken, it is necessary to release any numeral keys which may have been depressed, to enable the keys to restore to their normal positions, and to free the slides R50 and their racks during the first part of the rotation of the clutch mechanism. This is accomplished in the following manner:

The total key 410, (Fig. 2), comprising a stem 411 and a stud 412, is mounted outside of the side frame B47 and is normally spring pressed by a spring 413. Depression of the total key causes the stud 412 to engage a bell-crank 414, (Fig. 33), pivoted at 415, and swing the upper end of said bell-crank forward. A lever 416 is connected to the bell-crank 414 by a link 417 and when the bell-crank swings forward it, in turn, swings the lever 416 to release a latch member L64 pivoted to the longitudinal sliding bar L51. This action permits a spring 418 to raise the hooked end, at the rear of the latch member L64, until it engages a roller D31 on the lower end of a pivoted arm D63 which is held in contact with a roller D32 mounted on the plate D55 secured to the drive shaft 01. The initial movement of the drive shaft 01 as it starts on its forward stroke will cause the roller D32 to swing the arm D63 to the left in Fig. 2 and thus move the latch member L64 and the sliding bar L51 to the left, and by the connections heretofore described, to swing the bell-crank L53 to release the shutter latches of the keyboard, thus permitting any depressed numeral keys K51—K59 to restore to idle position.

In the normal position of the machine, a stud 419 on the lever 416 passes under the forward end of the member L64 and holds the hooked end of said member disengaged from the arm D63. A spring 420, (Fig. 2), connected to the lever 416, because of the manner in which the parts contact, forces the hooked end clear of the roller D31 during the time the total key is elevated.

As is usual in computing machines when it is desired to rotate the accumulating wheels of an accumulator to zero, and to print the total registered on said accumulating wheels, the accumulator is engaged with its actuating means at the initial movement of the shaft 01. The means for effecting this is as follows:

To the upper end of the total bell-crank 414, (Fig. 33), is pivoted a link 421, which extends rearward and is connected to a three-armed rocker 422, (Fig. 2) secured to a transverse shaft 423, which passes through the side frames of the machine, and secured to the right-hand end thereof is a similar three-armed rocker 424, (Fig. 33).

A total or sub-total taking pitman 425, on the right-hand side of the machine and forked at its rear end, is provided with a slot 426 to engage and slide upon a supporting stud 427 on the rearward extending arm of the three-armed rocker 424 and the forward end of the pitman is pivoted at 428 to a depending cam arm 429 which, in turn, is pivoted to the side frame at 430. The lower end of the depending cam arm 429 has a cam-surface overlying the roller 028 on the drive arm 051, and said cam surface is so formed that the roller has only a momentary action upon the lever. Loosely mounted intermediate its ends on a transverse shaft 431, located at the rear of the pitman 424, is a lever 432, the upper end of which is connected to the arm 290 of the accumulator shifting bell-crank 286 by a link 434. Near the lower end of the lever 432 is a stud 436 projecting inwardly but normally out of line with the lower prong of the forked rear end of the pitman 425. Depression of the total key 410 swings the bell-crank 414, and by the connections described, rotates the shaft 423 to shift the rear end of the pitman 425 downwardly and position its lower prong in line with the stud 436 on the lever 432 connected to the accumulator shifting mechanism. When the drive arm 051 swings upward, the roller 028 forces the cam arm 429 and the pitman 425 rearward. The lower fork of the pitman striking the stud 436, swings the upper end of the lever 432 forward and said lever being connected to the arm 290 rocks the shaft 104 and its accumulator engaging arms 100, 102 (Fig. 11) to engage the alined accumulator 76 with the actuating means as heretofore described.

It is pointed out that the control disk 296, in the normal operations of the machine, controls the functions of the machine to add. The engagement of the accumulator 76 with the actuating means, before the racks R50 move rearward, while said disk is positioned for adding, causes the accumulating wheels to rotate in the reverse direction, and the accumulating wheels are stopped at the zero position by the following means:

Located at the rear of the carry trip levers 142, (Figs. 3 and 34), is a universal rod 442, supported by arms 440 secured to a transverse shaft 438. The universal rod spans the extensions 148 of all the carry trip levers and is forced against the extensions at the proper time to hold the trip levers 142 from rotating or being depressed when the accumulating wheels rotate in reverse direction on total taking operations, and the two-point cams 80 contact with the front edges of the trip levers. The rod 162 heretofore described as the aligning means for the trip levers 142, is shiftably mounted in the side frames and normally held at the rear of slots 444, (Figs. 1 and 2), in the side frames 66 and 67, by springs 446 connected to the ends of the alining rod. When the universal rod 442 is forced against the extensions 148 of the carry tripping levers 142, the alining rod 162 moves forward, permitting the rod 442 to rock the trip levers 142, slightly elevating the noses 146 of the trip levers. This adjustment is for the purpose of overcoming any lost motion, thereby insuring proper alignment of the accumulating wheels in total taking operations and insuring their arrest in their zero positions.

On the left-hand end of the shaft 438 is secured an arm 448, provided with a stud 450 to engage a latch 452 mounted on a pivot 454. A spring 456 secured to arm 448, tends to turn the shaft 438, and rock the arm 448 and the universal rod 442 forward when the latch 452 is displaced. The latch is connected to the three-armed lever 422 by a link 458 and is swung clear of the stud 450 when the lever 422 is rotated by the depression of the total key 410. The arm 448 and the universal rod 442 do not immediately move forward, being held rearward by a depending lever 458' loosely mounted on the shaft 438 alongside the arm 448. The lever 458' is provided at its lower end with a lug, which lies in the path of and contacts the arm 448, and said lever is forced rearward by the rear end of the cam shaft drive rack 243 engaging a projection 459 on said lever, (Fig. 2). When the total key is depressed and the machine is operated to advance the cam shaft drive rack 243, the parts described are free to move forward to lock the trip levers 142.

Means are provided to lock the universal rod 442 in its forward position so that when the two-point cams 80 strike the noses 146 of the trip levers 142, the momentum of the slides R50 will not cause a disalignment of the accumulating wheels. Pivoted to the lower end of the arm 448 is a bar 460, which bar at its forward end is formed into a latch to engage a block 462 mounted on the side frame 67.

The engagement of the accumulator 76 with the actuating means and the locking of the rod 442, takes place before the slides R50 move rearward. The accumulating wheels of the engaged accumulator will rotate until the two-point cams 80 contact the noses 146 of the trip levers 142 and the slides R50 under control of the accumulator wheels will move rearward to correspondingly position the type-sectors. Before the slides R50 are restored to their normal positions, in a totaling operation, the engaged accumulator is released from the actuating means in the following manner:

Mounted on the pivot 415, (Fig. 34), which supports the total key bell-crank 414, is a similar bell-crank 464 to which is pivoted the forward end of a link 465, the rear end of which is connected to an arm 466 secured to the left hand end of a transverse shaft 467. On the right-hand end of the transverse shaft 467 is secured an arm 468, which supports a link 469 to which is pivoted the forward end of a second pitman 470. The rear end of the pitman 470 is forked and is provided with a slot for slidable support on the stud 427 in the same manner as the pitman 425. The forward end of the pitman 470 is provided with an extension 471 that in the normal position of the machine lies above a block 472 (Fig. 35), secured to the upright rocking arm 063.

As heretofore pointed out, the upright rocking arm 063 is forced rearward when the roller 028 engages the cam-surface 37 and this action takes place after the slides R50 have moved rearward. When the total key 410 is depressed the stud 412 engages the bell-crank 464, and by the connections described, lowers the forward end of the pitman 470, positioning the extension 471 in the path of travel of the block 472. The shaft 423 is rotated at the same time, by the connections between said shaft and the bell-crank 414, to lower the rear ends of the pitmen 425 and 470.

Secured to the shaft 431, (Figs. 33, 34 and 35), between the lever 432 and the side frame 66, is a lever 473, which resembles the lever 432. The pitmen 425 and 470 lie between the levers 473 and 432 and the lever 473 is provided at its lower end with a stud 474, normally out of line with the lower prong of the forked rear end of the pitman 470. It is pointed out that the lever 432 is loosely mounted on the shaft 431 and that the pitman 425 moves rearward to strike the stud 436 during the time the roller 028 moves from its normal position to the point marked "X" in the cam slot 601 (Fig. 1). When the roller 028 moves upward from the point marked "Y" of the cam slot 601 it strikes the cam-surface 37 connected with the rocking arm 063 to rock the arm clockwise (Fig. 35) and cause the block 472 to strike the extension 471 of the pitman 470 and drive it bodily rearwardly. The pitman 470, striking the stud 474 on the lever 473, rotates the shaft 431.

Secured to the shaft 431, between the side frames, and near the frame 67, is a third lever 476, (Fig. 36). This member is identical in shape and size with the lever 473 and hidden from view in Fig. 34, by said lever 473. Referring to Fig. 34, the upper end of the lever 476 is connected to the accumulator latch 116 by a link 478. Said latch and the companion latch 114 at the opposite end of the shaft 118, as heretofore described, lock the selected accumulator when engaged with the actuating means. The rotation of the shaft 431 swings the upper end of the lever 476 forward to release the latches 114, 116 from the accumulator engaging arms 100, 102 to enable the engaging arms to disengage the accumulator from its actuating means by the mechanism heretofore described. The roller 028 (Figs. 1 and 19) in moving along the cam-surface 37, will also strike the connector 270 which, in adding operations, operates to engage the alined accumulator with the actuating means, and, with no provisions to the contrary, operation of the connector by the roller 028 in totaling operations would prevent the accumulator from being released. Means are accordingly provided to disconnect the coupling 280 from the accumulator shifting bell-crank 286 when the total key is depressed, and this is accomplished in the following manner:

To the three-armed lever 424, on the right-hand side of the machine, (Figs. 1 and 33), is pivoted a link 480, the rear end of which engages a stud 482 on the coupling 280. When the total key 410 on its depression, rocks the three-armed piece 424, the link 480 moves the coupling 280 rearward, so that the hooked end 282 will not engage the block 284 on the arm 286 when the coupling 280 is depressed.

The control disk 297, heretofore described to control the computing in the lower group of accumulators 77, will cause the lower actuator to transfer or introduce to the aligned lower accumulator the accumulations or totals of the different upper accumulators 76 as said totals are printed. If, during the operations of computing, in the first columnar position of the work-sheet, the amounts printed therein, are added to the aligned lower accumulator, and in the second columnar position the amounts are subtracted from the aligned lower accumulator, the aligned lower accumulator may be arranged to compute the difference of the two amounts as the amounts are printed across the work-sheet. When the accumulations of all the amounts printed in the first columnar position is recorded the accumulation may be automatically added to the aligned lower accumulator, and when the accumulations of all the amounts printed in the second columnar position is recorded the accumulation may be automatically subtracted from the aligned accumulator and the aligned lower accumulator will compute the difference of the two accumulations.

If it is desired not to transfer the accumulations or totals of the upper group of accumulators, as above described, the latch 136, (Fig. 2), of the manual shifting mechanism for the lower group of accumulators is moved and locked in the first notch 134. If, for instance, it is desired to transfer the accumulations or totals of the upper group of accumulators in a different manner than is provided for by the normal arrangement of the control disk 297 used while said totals were accumulated, this control disk is removed from the upper reel shaft 64 and the desired control disk mounted on said shaft before the totals are printed.

Means are provided to lock the slides R50 against uncontrolled rearward travel, when the accumulator is released from the actuating means, in the following manner: The upper prong of each slide R50, (Figs. 3 and 36), is provided with teeth 483 and mounted on the shaft 212 are a series of pawls 484, one for each slide R50. The pawls 484 are normally held disengaged from the teeth 483 by a bail 485 contacting cam-surfaces 486 formed on the lower edges of said pawls. The bail 485 is formed with arms 488 and 489 loosely mounted on the shaft 423. A latch 490, losely mounted on the shaft 467, engages a lug on the upper end of the arm 489 to hold the bail 485 rearward, and a link 491 connects said latch and the lever 476. When the lever 476 rocks clockwise (Fig. 36) to disable the coupling 280 and thus free the accumulator for disengagement from its actuating pinions 52, the latch 490 is swung clear of the lug on the arm 489 and the bail 485 moves forward, under the influence of a spring 492, to permit the pawls 484 to engage the teeth 483. Secured to the shaft 212 is a finger 493, the end of which engages a stud 494 on the bail arm 489, when the bail 485 moves forward. It has been pointed out that the shaft 212 is slightly rotated after the slides R50 move back to their normal positions and the finger 493, moving with said shaft, forces the bail 485 rearward, elevating the pawls 484, and the latch 490 swings to its locking position.

As will be hereinafter more fully described, the shafts 423, (Fig. 2), carrying the three-armed levers 422, 424 and the shaft 431 carrying the levers 432, 473 and 476 are rotated in both directions and to maintain said shafts, and the parts connected thereto, in alignment, the following means are provided: Secured to the left-hand end of the shaft 431 is an arm 495, and engaging a stud 496 on said arm, are two centering levers 497 and 498. These centering levers are mounted on a pivot 499 and are drawn together by a spring 500. A stud 501, projecting from the side frame 67, arrests the levers in normal position. When the shaft 431 is rotated in either direction the levers will act upon the stud 496 to return the parts connected to said shaft to their normal positions. The shaft 423 is provided with a similar mechanism and the parts are arranged on the left-hand end of said shaft between the side frame 67 and the three-armed lever 422.

To complete a total operation and to restore the mechanism of the machine for subsequent operations it remains to release the locked universal rod 442 (Figs. 1 and 16), and this is accomplished in the following manner: Secured to the cam shaft 172, (Figs. 2 and 35), rotated by the drive rack 243, is a cam 502, including oppositely extending arms the free ends of which are provided with lugs 503 and 504. As the cam shaft 172 rotates the lug 503 strikes the forward end of the latching bar 460, releasing said bar from the block 462. There is sufficient backlash to slightly retract the latching bar 460 and thus prevent it from again engaging the block 462 when the lug 503 swings clear of said bar, and as the cam shaft rack 243 strikes the roller 459, the arm 458' (Fig. 34) moves the arm 448 rearward. The latch 452 (Figs. 2 and 34) is restored to its normal position to lock the arm 448 in idle position by a spring 505 and under the influence of a spring 506, the forward end of the latching bar 460 is raised and rests against the block 462.

Depression of the sub-total key 510, (Fig. 2), acts upon a bell-crank 511, the upper end of which is connected to the bell-crank 414 by a link 512, and in this manner actuates the bell-crank 414. Depression of the sub-total key, however, does not affect the bell-crank 464 and hence the extension 471 (Fig. 35), of the pitman 470, is not lowered into the path of travel of the block 472. The accumulator remains engaged with the actuating means during the full time the slides R50 move back and forth and is released at the time, heretofore described, for releasing the accumulator during the operation of adding.

16. Automatic total and sub-total mechanism

Illustrated particularly in Figs. 2, 31, 34, 35, 36 and 37.

Totals and sub-totals of the lower group of accumulators are controlled automatically by control disks mounted on the left-hand side of the upper reel shaft 64. If any of the accumulators of the lower group are manually aligned with the actuating means, during the time the paper-carriage moves from right to left, the total printing positions may be determined on the work-sheet in the following manner:

If only one lower accumulator 77 is aligned with the actuating means during the time the paper-carriage moves from right to left, and the amounts printed in the first columnar position of the work-sheet are added to the aligned lower accumulator, and, if the amounts printed in the second columnar position are subtracted from the aligned lower accumulator, the difference can be automatically printed in the third columnar position. It will be understood that the computing is done crosswise, i. e., when the amount is printed in the first columnar position the paper-carriage moves automatically to the second columnar position, and so on.

A total control disk 515, (Fig. 37), is provided with a cam-node 516 to co-act with a roller 517 on a lever 518, which lever depends from the supporting rod 386.

The cam-node 516 is arranged on the total control disk, in this case, for example at the third columnar position of said disk, as the upper reel shaft 64 rotates; that is to say, when the paper-carriage is in the first columnar position the cam-node 516 is relatively two columnar spaces from the roller 517; when the paper-carriage is in the second columnar position the cam-node is relatively one columnar space from the roller, and, as the paper-carriage moves to the third columnar position, the cam-node contacts the roller and the lever 518 is forced forward.

It will be understood that the paper carriage, in columnar tabulation, steps from right to left, making such step at the end of each operation of the machine, except the last, so as to set or position the parts controlled thereby on that operation just preceding the one for which such setting is desired. In other words, the parts are automatically set prior to the operation during which such setting is made effective.

The lever 518 is connected to the three-armed lever 422, (Figs. 2 and 37) by a link 519 and the forward movement of said lever 518 rotates the shaft 423 in the reverse direction to that heretofore described. In this manner the rear end of the total controlling pitman 425 is raised (instead of being lowered, as when the total key 410 is depressed) to position the upper prong of the forked pitman in line with the stud 437 on the lever 432 and when said pitman is forced rearward by the roll 028 and arm 429, it strikes the stud 437 on the upper end of the lever 432 and rocks the lever in the reverse direction to that in which it is rocked in taking a total of an upper accumulator. The lower end of the lever 432 is connected to the arm 291 of the accumulator engaging and disengaging bell-crank 287 by a link 435 and when said lever 432 is swung on its pivot 431, the aligned lower accumulator 77 is automatically engaged with the actuating means.

The numeral keys and the slides R50 are automatically released in the following manner: Mounted on the rearwardly extending arm of the three-armed lever 422 (Figs. 2 and 37), by a stud and slot connection, is a link 520, which extends forward to the lever 416. The link 520 is shouldered to contact a stud 521 on the lever 416, and the end of said link is hooked to embrace the lever and rest on the stud to prevent displacement. When the three-armed lever 422 rotates, it raises the rear end of the link 520 into the path of travel of a lug 522 (Fig. 2) formed on the arm 401. It has been pointed out that the arm 401 is held rearward by a stud 402 on the cam shaft drive rack 243 and when released swings forward under the influence of the spring 403. When the drive rack 243 moves forward, the arm 401 in turn, moves the link 520 forward to swing the lever 416 clear of the latch member L64, whereupon the hooked end of the latter engages the roller D31, whereupon the sliding bar L51 (Fig. 2) is actuated to release any depressed numeral keys, and slides R50 are released in a manner described heretofore. The link 520 is released from the stud 521 when the drive shaft 01 rotates, by a stud 523 projecting inwardly from the arm 245 fast on the drive shaft and the link is moved rearward under the influence of a spring 524 to again engage its shoulder with the stud 521 when the cam rack 243 forces the arm 401 rearward.

A total control disk 525, (Figs. 2 and 35), with a cam-node 526 greater in extent than the cam node 516 on the total control disk 515, co-acts with a roller 527 on a lever 528, which depends from the supporting rod 386, and said lever is connected to the arm 466 by a link 529. When the lever 528 swings forward, it rocks the arm 466 forward and, as heretofore pointed out, the forward movement of the arm 466 rotates the shaft 467 and arm 468 to lower the forward end of the total control pitman 470 to position the extension 471 in the path of the block 472 on the rocking arm 063. The rear end of the pitman 470, by the rotation of the shaft 423, due to the contact of the node 516 on total control disk 515, with its lever 518, is raised at the same time, as heretofore explained, and when the block 472 strikes the extension 471 on the pitman, the rear upper prong of said pitman strikes a stud 475 on the upper end of the lever 473. This rocks the lever 473 and rotates the shaft 431 in the reverse direction to that pointed out for releasing the engaged upper accumulator. The lower end of the lever 476, (Fig. 36), secured to the shaft 431, is connected to the accumulator locking latch 117, (Fig. 34), by a link 479, and when the lower end of said lever is forced forward the engaged lower accumulator is freed for release from the actuating means.

During the time the aligned lower accumulator remains engaged with the actuating means, the accumulating wheels 77 are rotated to zero and the degree of said rotation may be printed on the work-sheet.

The means provided to lock the carry trip levers 143, (Fig. 35), are substantially the same as the means to lock the trip levers 142. A link 530, provided with a slot 531, is connected at its front end to the lower end of the lever 518, (Fig. 37), and the rear end of said link is connected to a latch 453 rotatable on a pivot 455. The latch engages a stud 451, (Fig. 35), to normally lock an arm 449 secured to a carry resetting shaft 439, upon which shaft are secured arms 441 carrying at their upper ends a rod 443, which rod spans the extensions 149 of the carry trip levers 143 for the lower accumulators. When the lever 518 is moved forward the latch 453 is disengaged from the stud 451 and a spring 457 will force the rod 443 forward against the extensions 149 in the same manner, as previously pointed out, when the universal rod 442 is moved forward against the extensions 148. However, the lug on the lever 458′, heretofore pointed out as engaging the arm 448, also contacts the arm 449 to hold said arm rearward during the time the machine is not operated. A latch bar 461 is connected to the upper end of the arm 449 and when said arm moves forward to back up the lower carry tripping levers 143, the latch bar engages a block 463 to lock the rod 443 in its effective position. The latch bar is released by a lug 504 on the cam 502, and when the cam shaft rack 243 strikes the roller 459, the arm 449 moves rearward to permit the latch 453, under the influence of the spring 505, to again engage the stud 451.

To the three-armed lever 424, (Figs. 1 and 37), secured to the shaft 423, is pivoted a link 481, the rear end of which is connected to a stud 483 on the coupling 281. When the operating lever 518 is moved forward by the cam-node 516 on the total control disk 515 to rotate the shaft 423, the said three-armed lever 424, by its link connection 481 with the coupling 281, moves the hooked end 283 clear of the block 285. It is now impossible for the lower accumulator to be moved into operative engagement with the lower actuator by the coupling 281.

The means to lock the slides R50 from continuing their rearward travel, when the lower accumulator is released, is substantially the same as that described for the upper actuating means, the difference being that the lever 476, (Fig. 36), swings in the opposite direction and the latch 490 is lowered, instead of being raised, to release the bail 485.

The total control disks 515, (Fig. 35), and 525 are joined together and separated by a collar 532 so that the cam-nodes 516 and 526 will not become relatively disarranged. Secured to the lock controlling disk 382, (Fig. 31), is a stud 533, which engages a hole 534 in the total control disk 526 and, when so engaged, the said disks will rotate with the upper reel shaft 64.

The operating levers 518 and 528, (Figs. 35 and 37), swing rearward, under the influence of springs 535 and 536, respectively, to restore to normal idle position the totalizing mechanism described, should the paper-carriage be moved from the total printing position before the total is printed, or said levers are similarly moved to perform the restoring operation after the total is printed and the paper-carriage is moved in either direction from the total taking position.

*Sub-total.*—As pointed out, if the amount printed in the first columnar position of the work-sheet is added to the aligned lower accumulator and the amount printed in the second columnar position is subtracted from the aligned lower accumulator, the difference may be automatically printed in the third columnar position of the work-sheet and said lower accumulator restored to zero.

If the total control disk 525, (Fig. 35), is not provided with a cam-node 526 to cooperate with its operating lever 528 during the same operation on which the node 516 of the total control disk 515 actuates its operating lever 518, the lever 528 will not move forward to lower the forward end of the total control pitman 470 and the lower accumulator will remain engaged with the actuating means during the full time the slides R50 move back and forth. Therefore the total or difference between the amount printed in the first columnar position, and the amount printed in the second columnar position, will be reaccumulated when the difference is printed in the third columnar position. If an amount printed in the fourth columnar position of the work-sheet is added to the aligned lower accumulator, the total or difference will be increased, and, if desired, the increased accumulation can be printed in the fifth columnar position of the work-sheet. If the increased accumulation is to be printed as a sub-total, the total control disk 515 is provided with a node 516 at the fifth columnar position, relative to the rotation of the upper reel shaft 64. If it is desired to print a total, i. e., clear the aligned lower accumulator, the total control disk 525 is also provided with a node 526 in the fifth columnar position to cooperate with the cam-surface 516.

The accumulations of the aligned lower accumulator can be automatically transferred to the aligned upper accumulator. However, the total control disks 515 and 525 must be removed from the reel shaft 64 when the total of the transferred accumulations is printed; that is to say, after the accumulations of the aligned lower accumulator have been transferred to an upper accumulator, for a grand total, to print said accumulation when registered on such upper accumulator, the total control disks must be removed before either the total or sub-total keys can be depressed. This results from the fact that the depression of the total and sub-total keys rotate the shaft 423 in the direction to lower the rear end of the total controlling pitman 425 and when the node 516 moves the operating lever 518 forward, the shaft 423 is rotated in the direction to raise the rear end of the total control pitman.

When the paper-carriage is in the position to print a total, or a sub-total, of the aligned lower accumulator, an amount set-up on the keyboard will be automatically eliminated before the slides R50 move rearward. It is pointed out that this is an important feature of the machine, as it prevents the operator from printing an item set up on the keyboard in a cross-total, or in a cross-subtotal position. It is also pointed out that the means for automatically printing cross-totals, or cross-subtotals, in certain positions or columns of the work-sheet, prevents the operator from printing totals other than in said total positions from the lower accumulators.

The accumulators 77 of the lower group can be aligned with the actuating means to conform with various demands of the user. For example, if in certain positions the amounts designate money values and in other positions the amounts designate numerical values, two accumulators of the lower group may be used to separately accumulate the respective totals of these two different classes of values.

*17. Automatic ribbon control mechanism*

Illustrated particularly in Figs. 2 and 38.

Mounted on the left-hand side of the shaft 64 is a ribbon shift disk 540 and depending from the rod 386 is a lever 541, provided with a roller 542 to co-act with said ribbon control disk. A link 543, provided with notches 544 and 545, is connected to the lower end of the operating lever 541 and the forward end of said link is supported by a link 546 mounted on an arm 547, loosely mounted on the shaft 467. The arm 547 is provided with a roller 548, which roller rests in a cut-out portion of the cam shaft rack 243, (Fig. 2). The lever 541 is moved rearward under the influence of a spring 549, and when in this rearward position, the forward end of the link 543 underlies a stud 550 projecting from a rocker 551 secured to a transverse shaft 552 and connected to said shaft is the mechanism to change the vibration of the ribbon holder, all of which is done in the manner usual in typewriting-machines.

When the rack 243 moves forward it raises the arm 547 and the link 543, striking the stud 550, rotates the shaft 552. In order that the shaft 552 may be rotated in the opposite direction, the ribbon shift disk 540 is provided with one or more nodes 553 to move the lever 541 forward, which lever in turn moves the forward end of the link 543 to underlie a stud 554 on the rocker 551. In this position the notch 544 underlies the stud 550 so that when the link 543 is raised to strike the stud 554, the stud 550 can move downwardly without interference. The rocker 551 is locked in either of its two positions by a detent 555 as is clearly shown in Fig. 2.

The ribbon shift disk 540 is secured to the total control disks 515 and 525 so that the three disks can be removed from the shaft 64 as a unit. The ribbon shift disk 540 is not provided with a hole 534, as is the total control disk 525, and this prevents the disks from being incorrectly mounted on the shaft 64.

When the lever 541 is in its rearward position the mechanism will so control the ribbon that amounts will be printed in the color on the upper half of said ribbon and when said lever is in its forward position the amounts will be printed in the color on the lower half of said ribbon assuming that the ribbon is black on the upper half and red on the lower half, and it is desired to print amounts in certain positions in red, the periphery of the ribbon shift disk 540 is provided with nodes 553 arranged relative to the positions or columns in which said amounts are printed; otherwise the amounts will be printed in black.

If it is desired to designate a cross-total, or a cross-subtotal, the color scheme can be either black or red. The ribbon shift disk 540 is provided with nodes 553 arranged relative to the columnar positions in which the totals are printed, if it is desired to print said totals in red.

For the purpose of printing an amount in red, when the reverse or subtracting mechanism is operated, and the normal arrangement of the printing is black, the following means are provided: Pivoted to an extension 560 of the selective control lever 344, (Fig. 2), is a link 561, the rear end of which is connected to the link 546; and, when the keystem 346 is depressed, the link 543 will be moved forward by the link connection.

While only one embodiment of the invention has been described in detail, and illustrated in the accompanying drawings, it is to be expressly understood that the drawings are for purposes of illustration only and are not designed as a definition of the limits of the invention, reference being had for this purpose to the appended claims.

What is claimed is:

1. A machine of the class described comprising, in combination, a travelling carriage, a plurality of independent accumulating means, means for independently or jointly at the same time actuating said accumulating means, and means, determined by the position of the carriage, for automatically conditioning the machine for totalizing from one of said accumulating means.

2. A machine of the class described comprising, in combination, a plurality of independent accumulating means each including a plurality of computing wheels, actuators for the accumulating means with which said accumulating means may independently or jointly engage at the same time, a travelling carriage, computing control means for said plurality of independent accumulating means operated by said carriage, totalizing means, and means for actuating said totalizing means operated by said carriage, said actuating means being adapted to automatically operate said totalizing means at predetermined positions of said carriage.

3. In a machine of the class described, the combination of a plurality of independent accumulating means, actuators for the accumulating means with which said accumulating means may independently engage or jointly engage at the same time, a movable carriage, accumulating control means operated by said carriage, totalizing means, and means controlled by said carriage for automatically setting said totalizing means at one or more predetermined positions of said carriage.

4. A machine of the class described comprising, in combination, a frame, accumulating means rotatably mounted thereon, one or more control disks adapted to rotate with said accumulating means, and means for actuating said accumulating means.

5. A machine of the class described comprising, in combination, a frame, accumulating means rotatably mounted thereon, one or more control disks adapted to rotate with said accumulating means, means for changing the angular position of said disk or disks relative to said accumulating means, and means for actuating said accumulating means.

6. A plurality of control disks for computing machines, said disks being arranged in removable groups, and one of said disks being mounted for angular movement relative to the other disks of said group.

7. In combination, an accumulating device adapted to add or subtract, operating mechanism therefor, totalizing means, an independent totalizer adapted for actuation by said operating mechanism independently of, or jointly with, said accumulating device, a traveling carriage, and means actuated by said traveling carriage for positively determining whether the operating mechanism shall actuate the accumulating device to add or subtract, or to totalize and also whether the totalizer shall be independently operated by the operating mechanism aforesaid, or operated by said operating mechanism jointly with said accumulating device.

8. In a calculating machine, the combination with accumulating means, actuating mechanism for said accumulating means, means for totalizing said accumulating means, operating means for putting the machine through its cycle of operation, a movable paper-carriage, control means automatically actuated by said paper-carriage independently of said operating means for setting said totalizing means, an independent totalizer subject to automatic control by the paper carriage to cause said totalizer to co-operate with the actuating mechanism jointly with the aforesaid accumulating means, and means for selectively manually controlling the co-operation of said totalizer with the actuating mechanism irrespective of the automatic control thereof by the paper carriage.

9. A machine of the class described comprising, in combination, accumulating means, operating mechanism for said accumulating means, means for totalizing said accumulating means, a movable member, and a disk actuated by said movable member for rendering said totalizing means effective when said member has moved to one or more predetermined positions.

10. A machine of the class described comprising, in combination, a group of accumulators mounted for bodily travel, operating mechanism for said accumulators, means for totalizing that one of said accumulators which the travel of the group brings into position for co-operation with said operating mechanism, a second group of bodily travelling accumulators, the individual accumulators of which may be selectively arranged for engagement with said operating mechanism jointly with the engagement of an accumulator of the first group, a movable paper-carriage, and control means actuated by said paper-carriage for controlling said totalizing means as said carriage moves to one or more predetermined positions, whereby totalizing may be effected in an accumulator of the second group or a total may be transferred thereinto from an engaged accumulator of the first group.

11. A machine of the class described comprising a frame, a travelling carriage, an accumulator, totalizing means therefor, means controlled by the carriage including a movable total control member mounted on the frame and for setting said totalizing means, said totalizing means being actuated when said member moves through a predetermined distance, and means to automatically set the total control member by the operation of the machine.

12. A machine of the class described comprising an accumulator, totalizing means therefor, and means including a forwardly advancing step-by-step rotatable total control member for automatically setting said totalizing means, said totalizing means being actuated when said forwardly advancing step-by-step rotatable member turns through a predetermined angular distance, and means to automatically turn the total control member in the aforesaid manner by the operation of the machine.

13. A machine of the class described comprising an accumulator totalizing means therefor, means for actuating said totalizing means, and a forwardly advancing movable total control cam, said actuating means being rendered operable to actuate the totalizing means upon movement of said total control cam through a predetermined angular distance, and means to automatically advance the total control cam by the operation of the machine.

14. A machine of the class described comprising, an accumulator, totalizing means therefor, and a control disk operable by the machine for automatically setting said totalizing means.

15. A machine of the class described comprising an accumulator, sub-totalizing means therefor, and means including a disk operable by the machine for automatically setting said sub-totalizing means, the periphery of said disk having radii of different lengths.

16. A plurality of control disks for computing machines, said disks being arranged in removable groups, and a plurality of said disks being mounted for angular movement relative to the other groups.

17. In a calculating machine, the combination with an accumulator, of actuating means therefor, a keyboard on which items or amounts may be preliminarily set up for subsequent entry into said accumulator through the actuating means aforesaid, operating means for putting the machine through its cycle to effect entry into the accumulator of the amount set up on the keyboard, means operable by the machine to automatically control a mathematical function of the accumulator, and key-operated means whereby the action of the control means may be varied at will to cause the accumulator to perform a different mathematical function.

18. In a calculating machine, the combination with an accumulator, of actuating means therefor, a keyboard on which items or amounts may be preliminarily set up for subsequent entry into said accumulator through the actuating means aforesaid, operating means for putting the machine through its cycle to effect entry into the accumulator of the amount set up on the keyboard, means operable by the machine to automatically control a mathematical function of the accumulator, and key-operated means whereby the action of the automatic control means may be varied at will to cause the accumulator to perform a different mathematical function which is the reverse of that for which the control means is normally set.

19. In a calculating machine, the combination with a travelling carriage, of an accumulator, actuating means therefor, a keyboard on which items or amounts may be preliminarily set up for subsequent entry into said accumulator through the actuating means aforesaid, operating means for putting the machine through its cycle to effect entry into the accumulator of the amount set up on the keyboard, means operable by the carriage as said carriage travels to automatically control a mathematical function of the accumulator, and normally inactive manually operable means adapted for utilization at will to vary the action of the controlling means aforesaid whereby the control of the accumulator is changed to cause the accumulator to perform a different mathematical function.

20. In a calculating machine, the combination with a travelling carriage, an accumulator, and actuating means for said accumulator, of a shiftable and rotatable cam disc, means operated by the movement of said carriage adapted to turn said cam disc as the carriage travels, means operated by said disc when said disc is turned by the movement of the carriage, adapted to control a mathematical function of the accumulator, and means operable at will to shift the disc independent of its normal operation by the carriage, thereby to vary the action thereof on the means operated thereby, whereby the control of said disc on the accumulator is changed to cause the accumulator to perform a different mathematical function.

21. In a calculating machine, the combination with an accumulator, and actuating means therefor, of a shiftable and rotatable cam disc, means operated by said disc when said disc is in its normal position adapted to control a mathematical function of the accumulator, a travelling carriage which turns the disc as said carriage travels, means operated by said disc when in its normal position adapted to control a mathematical function of the accumulator, a manually operable key for shifting the disc, thereby to vary the action of the disc on the means operated thereby, whereby the control of said disc on the accumulator may be changed at will to cause the accumulator to perform a different mathematical function.

22. In a calculating machine having a frame and a travelling carriage, the combination with an accumulator mounted on the frame, and means to actuate the accumulator, of carriage-coordinated adjustable means mounted on said frame and which may be arranged so that when shifted in step-by-step order as the carriage travels it will variously control the accumulator as to adding, subtracting and non-computing in any predetermined sequence, and means operated by the carriage, as it travels, to automatically adjust the carriage-coordinated controlling means in step-by-step fashion to cause it to affect the accumulator in the sequence of control for which the adjustable means has been arranged.

23. In a calculating machine, the combination with the frame thereof, and a travelling carriage, of a group of accumulators mounted on said frame so as to be stationary in relation to the travel of said carriage, means to automatically shift the group of accumulators to select a desired accumulator for operation, means common to the group of accumulators, to actuate the selected accumulator, and means shiftable with the group of accumulators to variously control the functions of the selected accumulator.

24. In a calculating machine, the combination with a group of accumulators, and actuators therefor, of an additional accumulator, means to select any accumulator of the group of accumulators for operation, totalizing mechanism for the additional accumulator, and means controlled by the selecting means for the group of accumulators, to automatically set the totalizing mechanism for effecting a totalizing operation of said additional accumulator.

25. In a calculating machine, the combination with a group of accumulators, and actuators, therefor, of an additional accumulator, means to select any accumulator of the group of accumulators for operation, totalizing mechanism for the additional accumulator, and means controlled by the selecting means for the group of accumulators, to automatically set the totalizing mechanism for effecting a totalizing operation of said additional accumulator simultaneously with the selection of a previously idle accumulator of the group of accumulators.

26. In a calculating machine, the combination with a traveling carriage, of a group of shiftably mounted accumulators adapted for selective positioning by the carriage, and actuators for the accumulators, of an additional group of accumulators, means to select any accumulator of the last-named group of accumulators for operation, totalizing mechanism for the additional group of accumulators, and means controlled by the selecting means for the first-named group of accumulators, to automatically set the totalizing mechanism for effecting a totalizing operation of any of the accumulators in the group of additional accumulators.

27. In a calculating machine, the combination with a traveling carriage and a platen carried thereby, of actuators, keys whose setting determines the extent of movement of said actuators when the machine is operated, a printing group adapted to print by a single operation on paper carried by said platen the complete number determined by the setting of said keys and the movement of the actuators, operating means for putting the machine through its cycle of movements, an accumulator carrier, a series of independent accumulators movably mounted on said carrier for bodily shifting, in succession, in relation to the carrier additional to their movement with the carrier, thereby adapting successive accumulators to be successively brought by said carrier into position for co-operation with the actuators as successive tabulations of the carriage cause said carrier to be shifted, means for bodily shifting each accumulator into co-operative relation with the actuators when the carrier has brought it to a position for co-operation with the actuators and driving means controlled by the travel of the carriage in both directions whereby the series of accumulators are positively shifted in step-by-step fashion as the carriage tabulates, and are returned to initial position when the carriage is returned to its starting point.

28. In a calculating machine, the combination with a traveling carriage and a platen carried thereby, of actuators, keys whose setting determines the extent of movement of said actuators when the machine is operated, a printing group adapted to print by a single operation on paper carried by said platen the complete number determined by the setting of said keys and the movement of the actuators, operating means for putting the machine through its cycle of movements, a rotatable reel, a series of independent accumulators movably mounted on said reel for bodily shifting in relation to said reel and adapted to be successively brought, by the turning of said reel, into position for co-operation with the actuators as successive tabulations of the carriage turn said reel, means for bodily shifting each accumulator into co-operative relation with the actuators when the reel has brought it to a position for co-operation with the actuators, and a positive driving connection between the carriage and the reel, whereby the reel is positively turned to shift the series of accumulators in step-by-step fashion as the carriage tabulates, and is turned backward to initial position when the carriage is returned to its starting point.

29. In a combined typewriting and calculating machine, the combination with a traveling carriage having a platen, of a calculating section comprising an accumulator, actuators therefor, and keys whose setting determines the extent of movement of said actuators when the machine is operated, a typewriting section comprising a keyboard, and printing means operated by said keyboard, tabulating means for the carriage, operating means for the machine, and means for automatically locking the operating means aforesaid when the typewriting section is being used and also during the period when the carriage is traveling from one tabulated position to another such position.

30. In a combined typewriting and calculating machine, the combination with a traveling carriage having a platen, of a calculating section comprising an accumulator, actuators therefor, and keys whose setting determines the extent of movement of said actuators when the machine is operated, a typewriting section comprising a keyboard, and printing means operated by said keyboard, tabulating means for the carriage, operating means for the machine, and means operated by the travel of the carriage when moving from one tabulated position to another such position which automatically locks the operating means during such movement and also when the typewriting section is being used.

31. In a calculating machine, the combination with a frame, a travelling carriage mounted on said frame, actuators, keys for determining the extent of movement thereof, and operating means for the machine, of a shiftable group of accumulators mounted on said frame in relatively stationary relationship to the travel of the carriage, means operated by the carriage when traveling from one tabulated position to another such position for shifting said group and thereby automatically selecting an accumulator from said group for use on a given operation of the machine, an additional group of accumulators mounted on the frame in relatively stationary relationship to the travel of the carriage, and manually operable means for selecting at will any accumulator of said additional group for use simultaneously with the selected accumulator of the carriage controlled group aforesaid.

32. In a machine of the class described, the combination with a set of accumulator wheels, of actuating means therefor, including reversing gear wheel means associated with each denominational wheel of the accumulator, a separate rack associated with each reversing gear wheel means aforesaid, means connecting the racks, means to effect a relative adjustment between reversing gear wheel means and the accumulator wheels to enable the reversing gear wheel means to control the direction of rotation of its associated accumulator wheel, a traveling carriage, means automatically set by the traveling carriage on the prior operation to effect the relative adjustment upon the succeeding operation, and means to control the excursions of the racks.

33. In a machine of the class described, the combination with an accumulator, of actuating means therefor, including driving pinions relatively to which the accumulator is engageable and dis-engageable, reversing gear wheel means associated with each driving pinion, double racks, the respective toothed sections of which are adapted to engage with its respective reversing gear wheel means at different times to effect either addition or subtraction, a traveling carriage, a rotary cam turned by the carriage when said carriage shifts, said cam when thus turned being adapted to automatically effect shifting of the reversing gear wheel means relatively to their associated racks, whereby the reversing gear wheel means may be engaged with either section of the double rack.

34. In a machine of the class described, the combination with the usual combined typewriting and adding machine having amount and letter keys, a traveling paper carriage adapted to letter space, an accumulator, and actuating means therefor, of an escapement for the traveling carriage, which escapement remains idle during the letter spacing travel of the carriage, a tabulating key, depression of which enables the escapement to control the travel of the carriage, means to retain the tabulating key depressed, and means to release the retaining means to enable the tabulating key to restore and render the escapement idle.

35. In a machine of the class described, having amount keys and typewriting letter keys, the combination with a traveling carriage, an accumulator, and actuating means therefor, the excursions of which are controlled by the amount keys, of an escapement for the traveling carriage, a tabulating key, depression of which leaves the carriage under control of the escapement, means to latch the tabulating key in depressed position, and means controlled by the escapement itself to release the latching means to enable the tabulating key to restore.

36. In a machine of the class described, the combination with a traveling paper carriage, a plurality of accumulators, actuating means therefor, and means to determine the excursions of such actuating means, of means controlled by the carriage to select a desired accumulator, an escapement for the carriage, a tabulating key, depression of which places the escapement in control of the carriage travel, means to latch the tabulating key in depressed position, and means operable by the carriage to release the latching means.

37. In a calculating machine, the combination with a traveling carriage, and an escapement therefor, of an accumulator carrier, a plurality of accumulators carried by said carrier, means co-operating with the carriage and said carrier whereby the carrier is shifted as the carriage travels, actuators which may co-operate with the accumulator selected by the travel of the carriage, and automatic means controlled by the travel of the carriage adapted to maintain the escapement in released condition so that the carriage will automatically continue to tabulate.

38. In a calculating machine, the combination with a traveling carriage, and an escapement therefor, of an accumulator carrier, a plurality of accumulators carried by said carrier, means co-operating with the carriage and said carrier whereby the carrier is shifted as the carriage travels, actuators which may co-operate with the accumulator selected by the travel of the carriage, manually operable means for releasing the escapement and for restoring said escapement to normal condition at will, of automatic means controlled by the travel of the carriage adapted to maintain the escapement in released condition so that the carriage will automatically tabulate.

39. In a combined typewriting and calculating machine, the combination with a tabulating travelling carriage having a platen adapted for use by the typewriting and calculating sections thereof, and a typewriter escapement for said carriage, of automatic means controlled by the travel of the carriage adapted to release the typewriter escapement when the carriage is in pre-determined tabulated positions of its travel so that the typewriter escapement mechanism will be rendered inoperative when the carriage is in number printing position.

40. In a calculating machine, the combination with a travelling carriage and a platen carried thereby, of actuators, keys whose setting determines the extent of movement of said actuators when the machine is operated, a printing group adapted to print by a single operation on paper carried by said platen, the complete number determined by the setting of said keys and the movement of the actuators, operating means for putting the machine through its cycle of movements, an accumulator carrier, a series of independent accumulators movably mounted on said carrier for bodily shifting in relation to the carrier and adapted to be successively brought by said carrier into position for co-operation with the actuators as successive tabulations of the carriage cause said carrier to be shifted, means for bodily shifting each accumulator into position for co-operation with the actuators when the carrier has brought it to a position where it can co-operate with the actuators, driving means controlled by the travel of the carriage whereby the series of accumulators is shifted in step-by-step fashion as the carriage tabulates and are returned to initial position when the carriage is returned to the starting point, and means automatically operated by the movement of the carriage which automatically determines whether the accumulator selected by the carriage for co-operation with the actuators will add or subtract when the carriage is in a given tabulated position.

41. In a calculating machine, the combination with a travelling carriage and a platen carried thereby, of actuators, keys whose setting determines the extent of movement of said actuators when the machine is operated, a printing group adapted to print by a single operation on paper carried by said platen, the complete number determined by the setting of said keys and the movement of the actuators, operating means for putting the machine through its cycle of movements, an accumulator carrier, a series of independent accumulators movably mounted on said carrier for bodily shifting in relation to the carrier and adapted to be successively brought by said carrier into position for co-operation with the actuators as successive tabulations of the carriage causes said carrier to be shifted, means for bodily shifting each accumulator into position for co-operation with the actuators when the carrier has brought it to a position where it can co-operate with the actuators, driving means controlled by the travel of the carriage whereby the series of accumulators is shifted in step-by-step fashion as the carriage tabulates and are returned to initial position when the carriage is returned to the starting point, means automatically operated by the movement of the carriage which automatically determines whether the accumulator selected by the carriage for co-operation with the actuators will add or subtract when the carriage is in a given tabulated position, and means operable at will adapted for reversing the normal operation of the last-named automatically operating means.

42. In a calculating machine, the combination with a travelling carriage and a platen carried thereby, of actuators, keys whose setting determines the extent of movement of said actuators when the machine is operated, a printing group adapted to print by a single operation on paper carried by said platen, the complete number determined by the setting of said keys and the movement of the actuators, operating means for putting the machine through its cycle of movements, an accumulator carrier, a series of independent accumulators movably mounted on said carrier for bodily shifting in relation to the carrier and adapted to be successively brought by said carrier into position for co-operation with the actuators as successive tabulations of the carriage cause said carrier to be shifted, means for bodily shifting each accumulator into position for co-operation with the actuators when the carrier has brought it to a position where it can co-operate with the actuators, driving means controlled by the travel of the carriage whereby the series of accumulators is shifted in step-by-step fashion as the carriage tabulates and are returned to initial position when the carriage is returned to the starting point, a rotary cammed disc automatically turned by the movement of the carriage, and means controlled by the cams on said disc which co-operates with the accumulator selected by the carriage to determine whether said accumulator will add or subtract when in a given tabulated position.

43. In a calculating machine, the combination with a travelling carriage and a platen carried thereby, of actuators, keys whose setting determines the extent of movement of said actuators when the machine is operated, a printing group adapted to print by a single operation on paper carried by said platen, the complete number determined by the setting of said keys and the movement of the actuators, operating means for putting the machine through its cycle of movements, an accumulator carrier, a series of independent accumulators movably mounted on said carrier for bodily shifting in relation to the carrier and adapted to be successively brought by said carrier into position for co-operation with the actuators as successive tabulations of the carriage cause said carrier to be shifted, means for bodily shifting each accumulator into position for co-operation with the actuators when the carrier has brought it to a position where it can co-operate with the actuators, driving means controlled by the travel of the carriage whereby the series of accumulators is shifted in step-by-step fashion as the carriage tabulates and are returned to initial position when the carriage is returned to the starting point, a pair of rotary adding and subtracting cam discs mounted for normal co-operation with each other to move as a unit and for relative turning to vary their normal co-operation, means for turning said discs, step by step by the movement of the carriage, means controlled by the cams on said discs which co-operate with the accumulator selected by the carriage to determine whether said accumulator will add or subtract when in a given tabulated position, and means operable at will adapted for changing the relative positions of said cam discs, thereby to reverse their normal operation.

44. In a calculating machine, the combination with a travelling carriage and a platen carried thereby, of double-rack actuators, keys whose setting determines the extent of movement of said actuators when the machine is operated, a printing group adapted to print on paper carried by said platen the complete number determined by the setting of said keys and the movement of said actuators, operating means for putting the machine through its cycle of movements, an accumulator carrier, a series of independent combined adding and subtracting accumulators movably mounted on said carrier for bodily shifting in relation to the carrier and adapted to be successively brought by said carriage into position for use as successive tabulations of said carriage causes said carrier to be shifted, means for bodily shifting each accumulator into position for turning by said actuators, driving means controlled by the travel of the carriage whereby the series of accumulators is shifted in step-by-step fashion as the carriage tabulates and are returned to initial position when the carriage is returned to its starting point, reversible bodily shiftable accumulator-operating pinions adapted to engage one or the other of the racks of the actuators, thereby to determine whether the accumulator selected for operation by the actuators will be additively or subtractively operated, and means operated by the movement of the carriage which automatically controls the shifting of the aforesaid pinions according to the tabulated position of the carriage, whereby the additive or subtractive operation of the selected accumulator is predetermined.

45. In a calculating machine, the combination of a travelling carriage, an accumulator, actuating means for the accumulator, a keyboard on which items or amounts may be preliminarily set up for subsequent entry into said accumulator through the actuating means aforesaid, operating means for putting the machine through its cycle to effect entry into the accumulator of the amount set up on the keyboard, means shifted by the movement of the carriage thereby to automatically control a mathematical function of the accumulator, and key operated means adapted, when manually operated, to vary the action of the controlling means, thereby to cause the accumulator to perform a different mathematical function.

46. In a combined typewriting and calculating machine, the combination with a travelling carriage having a platen, of a calculating section comprising an accumulator, actuators therefor, and keys whose setting determines the extent of movement of said actuators when the machine is operated, a typewriting section comprising a keyboard, and printing means operated by said keyboard, tabulating means for the carriage, operating means for the machine, and means for automatically locking the operating means aforesaid when the aforesaid tabulating means is being used.

47. In a combined typewriting and calculating machine, the combination with a travelling carriage having a platen, of a calculating section comprising an accumulator, actuators therefor, and keys whose setting determines the extent of movement of said actuators when the machine is operated, a typewriting section comprising a keyboard, and printing means operated by said keyboard, tabulating means for the carriage, operating means for the machine, and means controlled by the carriage which automatically locks the operating means to render the calculating section inoperable when the typewriting section is being used.

48. In a calculating machine, the combination with accumulator-actuators having two racks, one for addition and the other for subtraction, of a movable accumulator carrier, a plurality of accumulators carried by said carrier, the movement of said carrier bringing said accumulators into position for use, driving pinions relatively to which the respective accumulators are engageable and disengageable when any selected accumulator is brought into position for use, reversing gear wheel means associated with each driving pinion and adapted for selective engagement with the respective racks of the actuators, a travelling carriage, means operated by the carriage for automatically shifting the carrier to position an accumulator for use, and means operated by the carriage for automatically shifting the reversing gear wheel means to engage said means with one or the other of said two racks.

49. In a calculating machine, the combination with accumulator-actuators having two racks, one for addition and the other for subtraction, of a movable accumulator carrier, a plurality of accumulators carried by said carrier, the movement of said carrier bringing said accumulators into position for use, driving pinions relatively to which the respective accumulators are engageable and disengageable when any selected accumulator is brought into position for use, reversing gear wheel means associated with each driving pinion and adapted for selective engagement with the respective racks of the actuators, a travelling carriage, means operated by the carriage for automatically shifting the carrier to position an accumulator for use, a rotary cam automatically turned by the carriage when the latter shifts, and means operated by said cam for automatically shifting the reversing gear wheel means to engage said means with one or the other of said two racks.

50. A machine of the class described comprising, in combination, a travelling carriage, a plurality of independent accumulating means, means for actuating said plurality of accumulating means in one direction for addition and in the opposite direction for subtraction, and means determined by the position of the carriage for automatically conditioning the machine for jointly at the same time computing in an accumulator and totalizing in a pre-determined accumulator.

51. In combination, an accumulating device adapted to add and subtract, sub-totalizing means, actuating means for said accumulating device and the sub-totalizing means, an independent totalizer adapted for actuation by said actuating means independently of, or jointly with, said accumulating device, and a travelling carriage and means under the control of said carriage for pre-determining whether said actuating means shall actuate the accumulating device to add or subtract, or said sub-totalizing means to sub-totalize, and also whether the totalizer shall independently engage the actuating means or engage said actuating means jointly with said accumulating device.

52. A machine of the class described comprising, in combination, an accumulator, actuating means therefor, totalizing means therefor, connections selectively effective to cause said accumulator and actuating means to cooperate to totalize, a carriage adjustable to various accounting positions, and a control member mounted separately from the carriage having coordinated movement with the carriage to selectively render said connections and totalizing means effective in a plurality of carriage positions.

53. A machine of the class described comprising, in combination, an accumulator, actuating means therefor, totalizing means therefor, connections selectively effective to cause said accumulator and actuating means to cooperate to variously compute, a carriage adjustable to various computing positions, and a control member mounted separately from the carriage having coordinated movement with the carriage to selectively render said connections effective in a plurality of carriage positions.

54. A machine of the class described comprising, in combination, an accumulator, actuating means therefor, means for controlling the accounting functions of the accumulator, a paper carriage movable laterally to different columnar positions, and a means rotated in coordination with and under the control of said carriage, to selectively render said controlling means effective.

55. A machine of the class described comprising, in combination, an accumulator, totalizing means therefor, means for controlling the operation of the totalizing means, a paper carriage movable laterally to different columnar positions, and a means rotated in coordination with and under the control of said carriage to selectively render the controlling means effective.

56. A machine of the class described comprising, in combination, a plurality of accumulators, actuating means therefor, totalizing means therefor, means for transferring totals from one accumulator to another, a paper carriage movable laterally to different columnar positions, and a mechanism moved in a path other than that of the carriage and in coordination with the carriage to render the transferring means effective.

57. A machine of the class described comprising, in combination, a plurality of accumulators, actuating means therefor, totalizing means therefor, means for transferring totals from one accumulator to another, a paper carriage movable laterally to different columnar positions, and a member moved in a path other than that of the carriage and in coordination with the carriage to render the transferring means effective in one or more of said columnar positions, as desired.

58. A machine of the class described comprising, in combination, an accumulator, actuating means therefor, mechanism effective to cause said accumulator and actuating means to cooperate to perform various accounting functions, a paper carriage movable to different columnar positions, and a rotatable member having movement relative to said carriage and rotated in coordination therewith to selectively render said mechanism effective.

59. A machine of the class described comprising, in combination, an accumulator, actuating means therefor, connections selectively effective to cause said accumulator and actuating means to cooperate to perform various accounting functions, a paper carriage movable laterally to different columnar positions, a rotatable member rotated under the control of said carriage to selectively render said connections effective, and a manipulative device for varying the mathematical control established by said rotatable member.

60. A machine of the class described comprising, in combination, an accumulator, actuating means therefor, connections selectively effective to cause said accumulator and actuating means to cooperate to perform various accounting functions, a paper carriage movable laterally to different columnar positions, a rotatable member rotated under the control of said carriage to selectively render said connections effective, and a manipulative device to shift the member independently of the carriage, to vary the control by said rotatable member.

61. A machine of the class described comprising, in combination, an accumulator, actuating means therefor, connections selectively effective to cause said accumulator and actuating means to cooperate to perform various accounting functions, a paper carriage movable laterally to different columnar positions, a rotatable member rotated under the control of said carriage to selectively render said connections effective, a manipulative device for adjusting said rotatable member independent of the carriage to vary the accounting function of said rotatable member as established by the carriage, and means to automatically restore the rotatable member to its former condition.

62. A machine of the class described comprising, in combination, an accumulator, key controlled actuating means capable of cooperating therewith to perform addition or subtraction, connections selectively effective to control such cooperation, a paper carriage movable laterally to different columnar positions, a rotatable member rotated under the control of said carriage and in coordination therewith to selectively render said connections effective whereby addition or subtraction will be performed or the amount set up on the actuating means will not be entered in the accumulator.

63. In a machine of the class described, a travelling carriage, a totalizer, means to add numbers thereto and subtract numbers therefrom, a control member for determining whether the totalizer will add or subtract during a given operation, and a connection between the carriage and the control member causing one to move in coordination with the other and relative thereto.

64. In a combined typewriting and computing machine, a travelling paper carriage movable to a plurality of accounting positions, spacing mechanism therefor, a totalizer, a movable computing control member adapted to control the type of computation to be performed by the totalizer, said control member being arranged for movement relative to the carriage and having a plurality of control fields, and a connection between the paper carriage and the control member causing one to move in coordination with the other to cause the control fields to successively become effective during operation of the spacing mechanism.

65. A machine of the class described comprising an accumulator, totalizing means therefor, and a control disk operable by the machine for automatically setting said totalizing means, the periphery of said disc having radii of different lengths.

66. A machine of the class described comprising an accumulator, sub-totalizing means therefor, and means including a disc operable by the machine for automatically setting said sub-totalizing means.

67. In a machine of the class described, computing mechanism, a rotatable control disc for governing the actuation thereof, the said disc having control fields different distances from the center of the disc and cam portions between such fields, and advancing means for the disc adapted to advance the same a predetermined amount upon each operation thereof.

68. In a machine of the class described, computing mechanism, a rotatable control disc for governing the actuation thereof, the said disc having control fields different distances from the center of the disc and cam portions between such fields, advancing means for the disc adapted to advance the same a predetermined amount upon each operation thereof, and a member cooperating with the disc and having a portion adapted to ride over the said cam portions and sectors during the advancing movement of the disc.

69. In a machine of the class described, computing mechanism, a rotatable control disc for governing the actuation thereof, the said disc having control fields different distances from the center of the disc and cam portions between such fields, printing mechanism, operating means therefor, and means to advance the disc upon operation of the operating mechanism.

70. A machine of the class described comprising, in combination, an accumulator, actuating means therefor, connections selectively effective to cause said accumulator and actuating means to cooperate to perform various accounting functions, a movable member adjustable to various accounting positions, a control member movable in coordination with said movable member and relatively thereto to selectively render said connections effective, and a separate device to vary the control of the control member.

In testimony whereof I have signed this specification.

JOHN G. DUNKER.

CERTIFICATE OF CORRECTION.

Patent No. 1,901,153.     March 14, 1933.

JOHN G. DUNKER.

It is hereby certified that error appears in the printed specification of the above numbered patent requiring correction as follows: Page 3, line 20, for "abouts" read "abuts"; and line 124, for "keystone" read "keystem"; page 9, line 1, before "area" insert "faced"; page 11, line 21, for "501" read "601"; page 12, line 41, strike out the word "actuating" and insert the same before "gearings" in the same line; page 13, lines 97 and 98, for "actuator" read "accumulator"; page 17, line 13, for "369" second occurrence read "360"; page 18, line 89, for "stop" read "step"; page 21, line 87, for "piece" read "lever"; and line 102, after "accumulator" insert the numeral "77"; page 27, line 31, claim 17, after "the" second occurence insert "automatic"; and that the said Letters Patent should be read with these corrections therein that the same may conform to the record of the case in the Patent Office.

Signed and sealed this 2nd day of May, A. D. 1933.

(Seal)     M. J. Moore.
Acting Commissioner of Patents.

ordination with said movable member and relatively thereto to selectively render said connections effective, and a separate device to vary the control of the control member.

In testimony whereof I have signed this specification.

JOHN G. DUNKER.

CERTIFICATE OF CORRECTION.

Patent No. 1,901,153.  March 14, 1933.

JOHN G. DUNKER.

It is hereby certified that error appears in the printed specification of the above numbered patent requiring correction as follows: Page 3, line 20, for "abouts" read "abuts"; and line 124, for "keystone" read "keystem"; page 9, line 1, before "area" insert "faced"; page 11, line 21, for "501" read "601"; page 12, line 41, strike out the word "actuating" and insert the same before "gearings" in the same line; page 13, lines 97 and 98, for "actuator" read "accumulator"; page 17, line 13, for "369" second occurrence read "360"; page 18, line 89, for "stop" read "step"; page 21, line 87, for "piece" read "lever"; and line 102, after "accumulator" insert the numeral "77"; page 27, line 31, claim 17, after "the" second occurence insert "automatic"; and that the said Letters Patent should be read with these corrections therein that the same may conform to the record of the case in the Patent Office.

Signed and sealed this 2nd day of May, A. D. 1933.

(Seal)  M. J. Moore.
Acting Commissioner of Patents.

CERTIFICATE OF CORRECTION.

Patent No. 1,901,153.  March 14, 1933.

JOHN G. DUNKER.

It is hereby certified that error appears in the printed specification of the above numbered patent requiring correction as follows: Page 3, line 20, for "abouts" read "abuts"; and line 124, for "keystone" read "keystem"; page 9, line 1, before "area" insert "faced"; page 11, line 21, for "501" read "601"; page 12, line 41, strike out the word "actuating" and insert the same before "gearings" in the same line; page 13, lines 97 and 98, for "actuator" read "accumulator"; page 17, line 13, for "369" second occurrence read "360"; page 18, line 89, for "stop" read "step"; page 21, line 87, for "piece" read "lever"; and line 102, after "accumulator" insert the numeral "77"; page 27, line 31, claim 17, after "the" second occurence insert "automatic"; and that the said Letters Patent should be read with these corrections therein that the same may conform to the record of the case in the Patent Office.

Signed and sealed this 2nd day of May, A. D. 1933.

(Seal)  M. J. Moore
Acting Commissioner of Patents.